US012638021B2

(12) United States Patent
Arnold et al.

(10) Patent No.: US 12,638,021 B2
(45) Date of Patent: May 26, 2026

(54) IMPELLER PUMP AND METHOD

(71) Applicant: PENTAIR FLOW TECHNOLOGIES, LLC, Delavan, WI (US)

(72) Inventors: Jacob Arnold, Enschede (NL); Raymond Johan Meijnen, Winterswijk (NL)

(73) Assignee: PENTAIR FLOW TECHNOLOGIES, LLC, Delavan, WI (US)

( * ) Notice: Subject to any disclaimer, the term of this patent is extended or adjusted under 35 U.S.C. 154(b) by 0 days.

(21) Appl. No.: 19/056,495

(22) Filed: Feb. 18, 2025

(65) Prior Publication Data

US 2025/0188945 A1 Jun. 12, 2025

Related U.S. Application Data

(63) Continuation of application No. 18/408,050, filed on Jan. 9, 2024, now Pat. No. 12,228,138, which is a continuation of application No. 17/309,763, filed as application No. PCT/US2019/067570 on Dec. 19, 2019, now Pat. No. 11,867,192.

(60) Provisional application No. 62/781,825, filed on Dec. 19, 2018.

(51) Int. Cl.
*F04D 29/22* (2006.01)
*F04D 1/00* (2006.01)

(52) U.S. Cl.
CPC ........... *F04D 29/2216* (2013.01); *F04D 1/00* (2013.01); *F05D 2250/232* (2013.01)

(58) Field of Classification Search
CPC ...... F04D 29/225; F04D 29/2216; F04D 1/00; F05D 2250/232
See application file for complete search history.

(56) References Cited

U.S. PATENT DOCUMENTS 2,138 A * 6/1841 Johnson ................ F04D 29/225 416/179
287,403 A 10/1883 Austin
1,763,595 A * 6/1930 Paatsch ................ F04D 29/225 415/196
2,611,578 A 9/1952 Biggs
3,156,190 A 11/1964 Stahle
(Continued)

FOREIGN PATENT DOCUMENTS

FR 2167656 A5 8/1973
GB 191026913 A 11/1911
(Continued)

OTHER PUBLICATIONS

International Preliminary Report on Patentability issued for International Application No. PCT/US2019/067570, Dated Jun. 16, 2021, 9 pages.
(Continued)

*Primary Examiner* — Nathaniel E Wiehe
*Assistant Examiner* — Jackson N Gillenwaters
(74) *Attorney, Agent, or Firm* — Husch Blackwell LLP

(57) ABSTRACT

An impeller assembly including a shroud and an impeller body. The shroud has an inner surface flaring outwardly from an inlet toward an outlet. The impeller body extends into the shroud. The impeller body has an eccentric apex that is connected to an inner surface of the shroud proximate an upstream edge of the inlet.

20 Claims, 29 Drawing Sheets

(56) References Cited

U.S. PATENT DOCUMENTS

| | | | | | |
|---|---|---|---|---|---|
| 3,295,456 | A * | 1/1967 | Warren | F04D 29/225 415/206 |
| 3,602,604 | A | 8/1971 | Ronellenfitch | |
| 3,707,334 | A | 12/1972 | Ohlsson et al. | |
| 4,648,796 | A * | 3/1987 | Maghenzani | F04D 7/04 415/218.1 |
| 6,343,909 | B1 | 2/2002 | Springer et al. | |
| 10,094,384 | B2 * | 10/2018 | McGinn | F04D 29/2216 |
| 2015/0361987 | A1 | 12/2015 | Lin et al. | |
| 2017/0096628 | A1 | 4/2017 | Bachellier | |
| 2018/0195490 | A1 * | 7/2018 | Edenholm | B05B 3/0463 |
| 2020/0378405 | A1 * | 12/2020 | Takehana | F04D 29/2227 |

FOREIGN PATENT DOCUMENTS

| | | | | |
|---|---|---|---|---|
| GB | 1315547 | A * | 5/1973 | F04D 29/183 |
| GB | 26913 | | 11/2000 | |

OTHER PUBLICATIONS

International Search Report and Written Opinion issued for International Application No. PCT/US2019/067570, Dated Mar. 24, 2020, 16 pages.

Examination Report issued for Indian Patent Application No. 202117031632, Dated Nov. 18, 2022, 6 pages.

Office Action issued for U.S. Appl. No. 17/309,763, Dated Apr. 14, 2023, 32 pages.

Supplementary International Search Report issued for European Patent Application No. 19836919.1, Dated Jul. 27, 2024, 3 pages.

Chinese Office Action Issued for Chinese Patent Application No. 201980089601.5, Dated Mar. 27, 2024, 13 pages.

Examination Report issued for European Patent Application No. 19836919.1, Dated Mar. 10, 2023, 9 pages.

Office Action for Chinese Patent Application No. 201980089601.5 issued on Sep. 28, 2024, 11 pages.

* cited by examiner

IMPELLER PUMP AND METHOD

CROSS-REFERENCE TO RELATED APPLICATIONS

This application is a continuation of U.S. patent application Ser. No. 18/408,050 filed on Jan. 9, 2024, which is a continuation of U.S. patent application Ser. No. 17/309,763 filed on Jun. 17, 2021 and issued as U.S. Pat. No. 11,867, 192, which is national stage entry under 35 U.S.C. § 371 of International Patent Application No. PCT/US2019/067570 filed on Dec. 19, 2019, which claims priority under 35 U.S.C. § 119 to U.S. Provisional Patent Application No. 62/781,825 filed on Dec. 19, 2018, the entire contents of which are herein incorporated by reference.

BACKGROUND

Fluid pumps are used in many applications in which the pumped fluid contains debris, particulates, fibrous materials, and other solid material. For example, in sewage or raw water applications, a variety of waste is contained in water. Generally, conventional fluid pumps include a bladed impeller with blades that extend from the center of a rotating shaft so that when rotated, fluid is propelled through a fluid system. In some applications, conventional impeller designs have been modified in an attempt to prevent pump clogging during operation.

Pumping liquids with a high solids content results in clogging of conventional impeller pumps, requiring regular cleaning, maintenance, and repair. Another problem occurring with such pumps is cavitation, i.e., the formation of bubbles in the pumped liquid, developed in areas of relatively low pressure around the impeller. When the bubbles collapse, shockwaves are generated which may cause significant damage to the impeller and the pump housing. Bladeless impellers have been developed in response to clogging concerns, however, conventional bladeless impeller designs still suffer from various drawbacks.

In some prior art pumps, an impeller for a non-clog pump is disclosed. The impeller has a conical hub carrying a single spiraling blade, which is asymmetrically arranged to reduce the risk of clogging around the hub. In practice, the asymmetric arrangement of a single blade results in a hydraulic imbalance and vibrations. Moreover, in practice such pumps are still prone to substantial clogging.

In another prior art pump, a bladeless impeller for a non-clog pump is disclosed. The impeller has a hollow tubular body to maximize through-flow in order to reduce clogging. It has been found that such impellers show very low pump efficiency.

Hence, there is a need for a pump showing substantially less clogging without imparting on pump efficiency.

SUMMARY

An object of the invention is achieved with a pump comprising an impeller having a hub with an impeller body. The impeller body comprises a base which is concentric relative to a rotational axis of the impeller, and at least one eccentric apex.

With such a pump, the risk of clogging is significantly less. The inflowing liquid does not impact any leading edge of a blade or vane or similar obstacles. The pump efficiency of the design disclosed herein was found to be substantially improved compared to the usual non-clog pump types.

A further advantage of the pump is that a straight, linear inflow is not required and is not hindered by turbulence in the inflow. This makes it possible to position the pump at a short downstream distance of a bend in a supply line.

In a specific embodiment, the pump comprises a tubular shroud having an upstream open end and a downstream open end defining an annular flow opening with the hub. The impeller body extends into the shroud with the eccentric apex directly adjacent to an inner surface of the shroud. The shroud can be a connected to the impeller body, e.g., to the apex or apexes. Alternatively, the shroud can be provided as a wear ring separate from the impeller with a clearance gap between the shroud and the apex or apexes. Such a clearance gap can, for example, be about 0.001 times the diameter.

The shroud may, for example, have a flaring shape with a larger diameter at the annular outflow opening and a smaller diameter at the level of the apex or apexes. In some instances, the flaring shape can, for example, be conical or trumpet-shaped. Alternatively, the shroud may be cylindrical or have any other suitable tubular shape allowing rotation of the impeller in the pump chamber about a rotational impeller axis during operation of the pump. The shroud is coaxial with the rotational axis of the impeller. The rotational impeller axis is the axis of rotation of the impeller during normal operation of the pump.

The impeller body can, for instance, comprise one or more oblique cones, each cone defining one of the apexes. The oblique cone or cones have an oblique cone axis and a cone diameter increasing from the apex to the base relative to the oblique cone axis. The diameter can increase linearly or non-linearly, e.g., exponentially to form a concave or convex cone surface. The concavity, or convexity of the cone surface can be adjusted for hydraulic optimization. The cone axis will typically be linear but can also be curved and/or have sections making an angle with each other.

In a specific embodiment, the impeller body has a vane extending between the apex and the base. The vane may for example extend radially and straight or spiraling from the apex to the base. If the impeller body has two or more apexes, then each apex may be connected to a similarly sized and shaped vane extending from the apex to the base. If the apex or apexes are adjacent to the inner surface of the shroud, the vane or vanes do not have a leading edge exposed to the inflow, resulting in minimal or no clogging.

Alternatively, good results are obtained if the impeller body has a trailing edge in the annular outflow opening between the shroud and the hub base at a distance from a radial plane through the apex. The trailing edge can be part of a vane or the impeller body and can be provided with a surface gradually spiraling or swirling down from the apex or one of the apexes to form the respective trailing edge. If the impeller body has more than one apex, the impeller body can be provided with a surface spiraling or swirling down from each apex to an associated trailing edge. The spiraling angle, projected on the base of the hub, can be less than 180 degrees. In some forms, the surface can spiral down from the apex around the impeller body at a spiraling angle between 180 and 270 degrees. In some forms, the surface can spiral down from the apex around the impeller body at a spiraling angle greater than 270 degrees.

The at least one eccentric apex and the trailing edge are arranged on a first plane, the at least one eccentric apex and the center point of the hub are arranged on a second plane, and an angle between the first and second plane can be an acute angle.

The end of the vane at the hub base may for example extend over the full width of the annular flow opening, i.e., from the edge of the shroud to the opposite part of the hub base.

Good results are obtained if the impeller comprises at least two apexes, for instance of two or more oblique cones. For example, the impeller may be provided with two oblique cones, e.g., of equal size and shape, symmetrically arranged relative to the rotational impeller axis. Optionally, the impeller has three or more of such conical hub bodies.

The base of the hub body is typically circular, although other cross-sectional profiles can also be used.

Some embodiments provide an impeller assembly including a shroud and an impeller body. The shroud has an inner surface flaring outwardly from an inlet toward an outlet. The impeller body extends into the shroud. The impeller body has an eccentric apex that is connected to an inner surface of the shroud proximate an upstream edge of the inlet.

In some forms, the impeller body has a helical ridge shaped to correspond to the inner surface of the shroud. The helical ridge may extend from the eccentric apex. The helical ridge may connect to the inner surface from the upstream edge to the outlet to a base of the impeller body. In some forms, the impeller body defines an inwardly-curved carve out shaped to correspond to the inner surface. A portion of the impeller body may join to the shroud along the inwardly-curved carve out. In some forms, at least a portion of the impeller body is integral with the shroud.

Some embodiments provide an impeller assembly that includes a shroud and an impeller body. The shroud has an inner surface. The impeller body is fixedly attached to and at least partially enshrouded by the shroud. The impeller body includes an oblique cone shaped to correspond to the inner surface.

In some forms, the oblique cone has a helical ridge shaped to correspond to the inner surface. The helical ridge may connect to the inner surface from an inlet to an outlet of the shroud. In some forms, the inner surface is connected to the impeller body along a helical inwardly-curved carve out of the oblique cone. In some forms, the oblique cone is asymmetrically concave. In some forms, the inner surface and a portion of the oblique cone define an offset distance from one another that narrows from an inlet to an outlet of the shroud. In some forms, the impeller body is integral with the shroud.

Some embodiments provide an impeller assembly that includes a shroud and an impeller body. The shroud has a flared inner surface. The impeller body is at least partially disposed in and connected to the shroud. The impeller body defines a rotational axis and has a plurality of fluid drivers. Each fluid driver has an apex offset from the rotational axis, and a helical vane extending radially outwardly and shaped to correspond to the flared inner surface.

In some forms, the plurality of fluid drivers are radially symmetrical about the rotational axis. The plurality of fluid drivers may be two fluid drivers opposing one another. In some forms, one or more of the vanes of the plurality of fluid drivers are connected to the flared inner surface. In some forms, the impeller is integral with the shroud. In some forms, the plurality of fluid drivers are connected to one another.

The invention is further explained with reference to the accompanying drawings showing exemplary embodiments. These and other features of the present disclosure will become more apparent from the following description of the illustrative embodiments.

Figure 1:
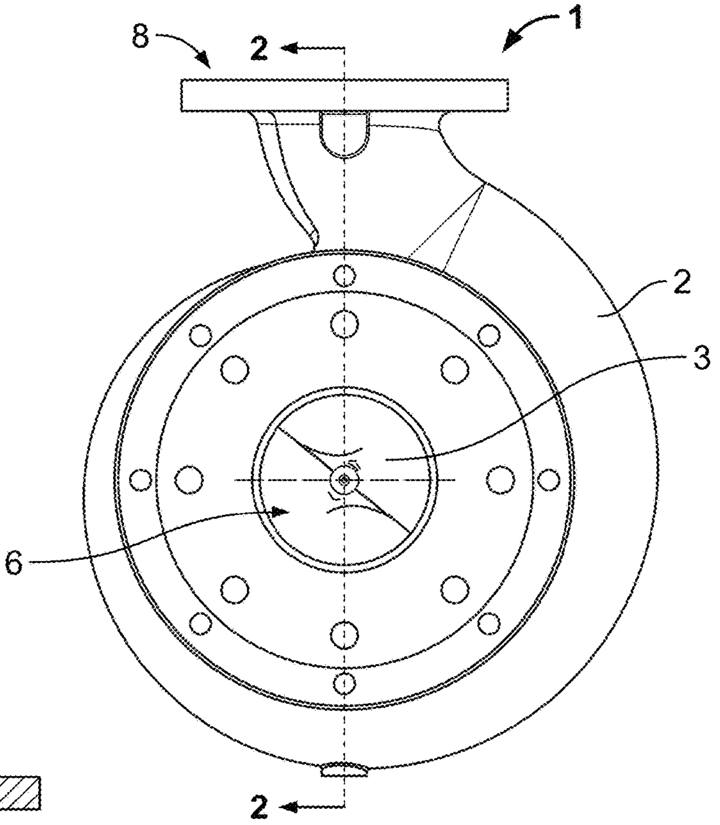
FIG. 1 is a top plan view of a centrifugal pump.

Corresponding reference characters indicate corresponding parts throughout the several views. Although the drawings represent embodiments of the present disclosure, the drawings are not necessarily to scale, and certain features may be exaggerated in order to better illustrate and explain the embodiments of the present disclosure.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

The invention generally relates to a pump with an impeller comprising a hub having an impelling body, typically surrounded by a shroud or shroud, in particular for pumping liquids, such as wastewater or other slurries, comprising solids, including fibrous materials.

Figure 2:
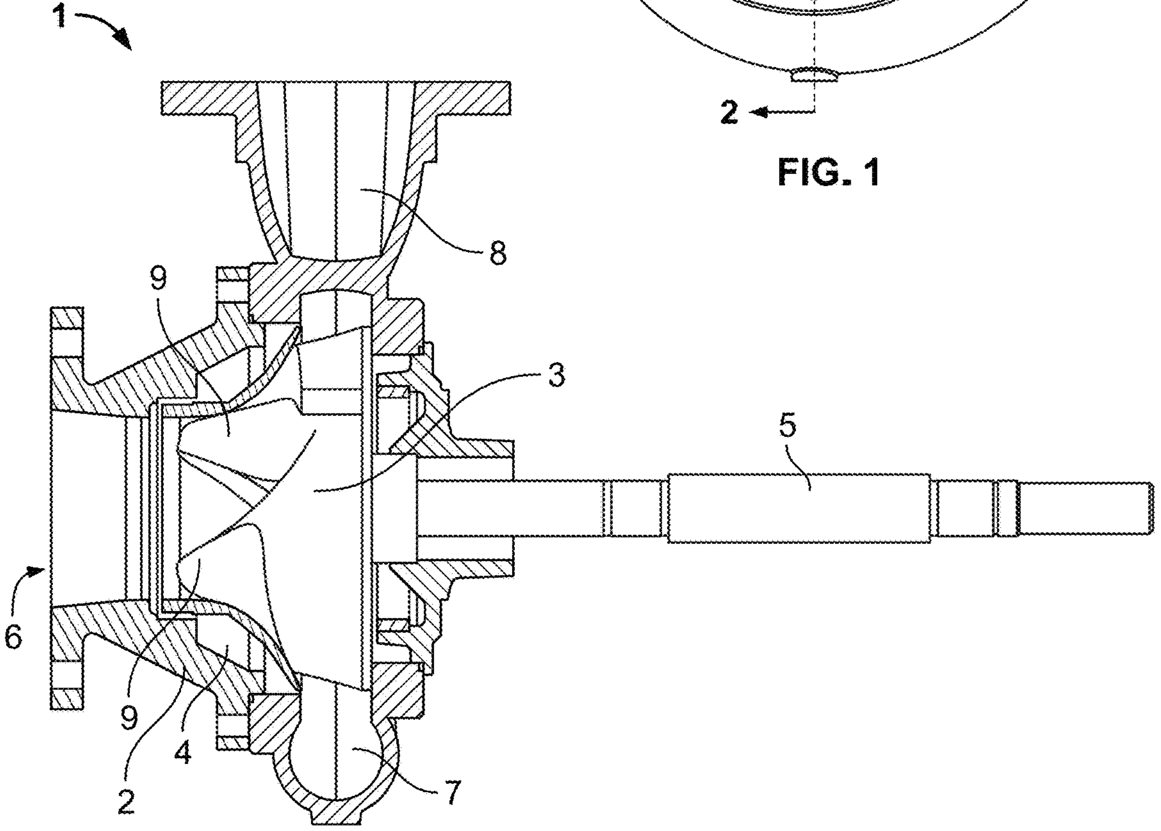
FIG. 2 is a side, partial cross-sectional view of the centrifugal pump of FIG. 1, taken along line 2-2 in FIG. 1.

FIGS. 1 and 2 depict a centrifugal non-clog pump 1 with a pump housing 2, an impeller 3 encased in a pump chamber 4 of the pump housing 2, and a drive shaft 5 for driving the impeller 3. The pump chamber 4 has an axially directed inlet 6 at its suction side and a circumferential volute 7 connecting to a radially directed outlet 8 at its pressure side. Each of the impeller embodiments disclosed herein can be integrated within a centrifugal non-clog pump, such as, for example, the pump 1 shown in FIGS. 1 and 2. In some forms, the outlet 8 can be configured to be tangentially directed from the circumferential volute 7. In some forms, the outlet 8 can be axially directed from the circumferential volute 7 toward the inlet 6 or toward the drive shaft 5.

Figure 3A:
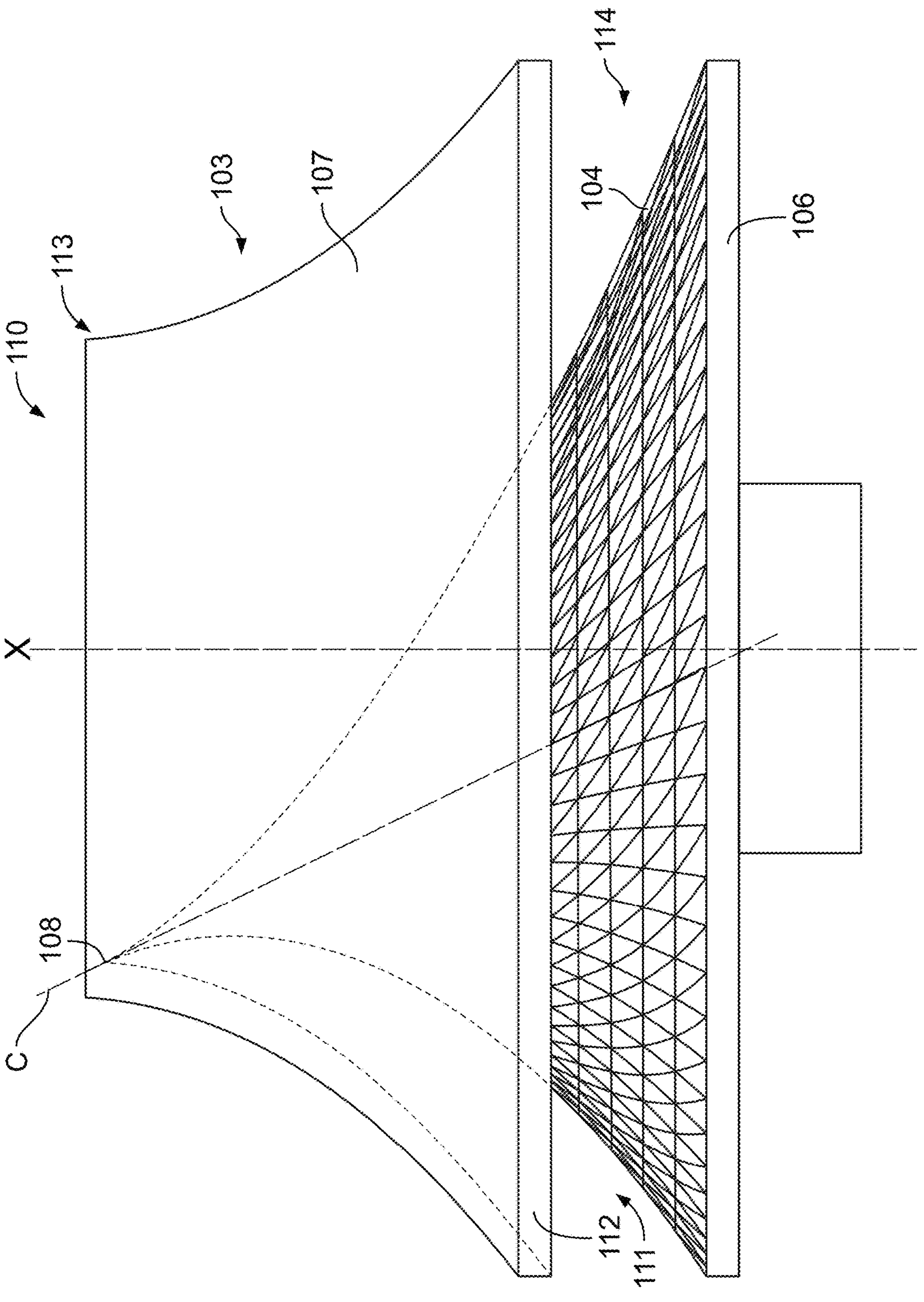
FIG. 3A is a side elevational view of an embodiment of an impeller.
Figure 3B:
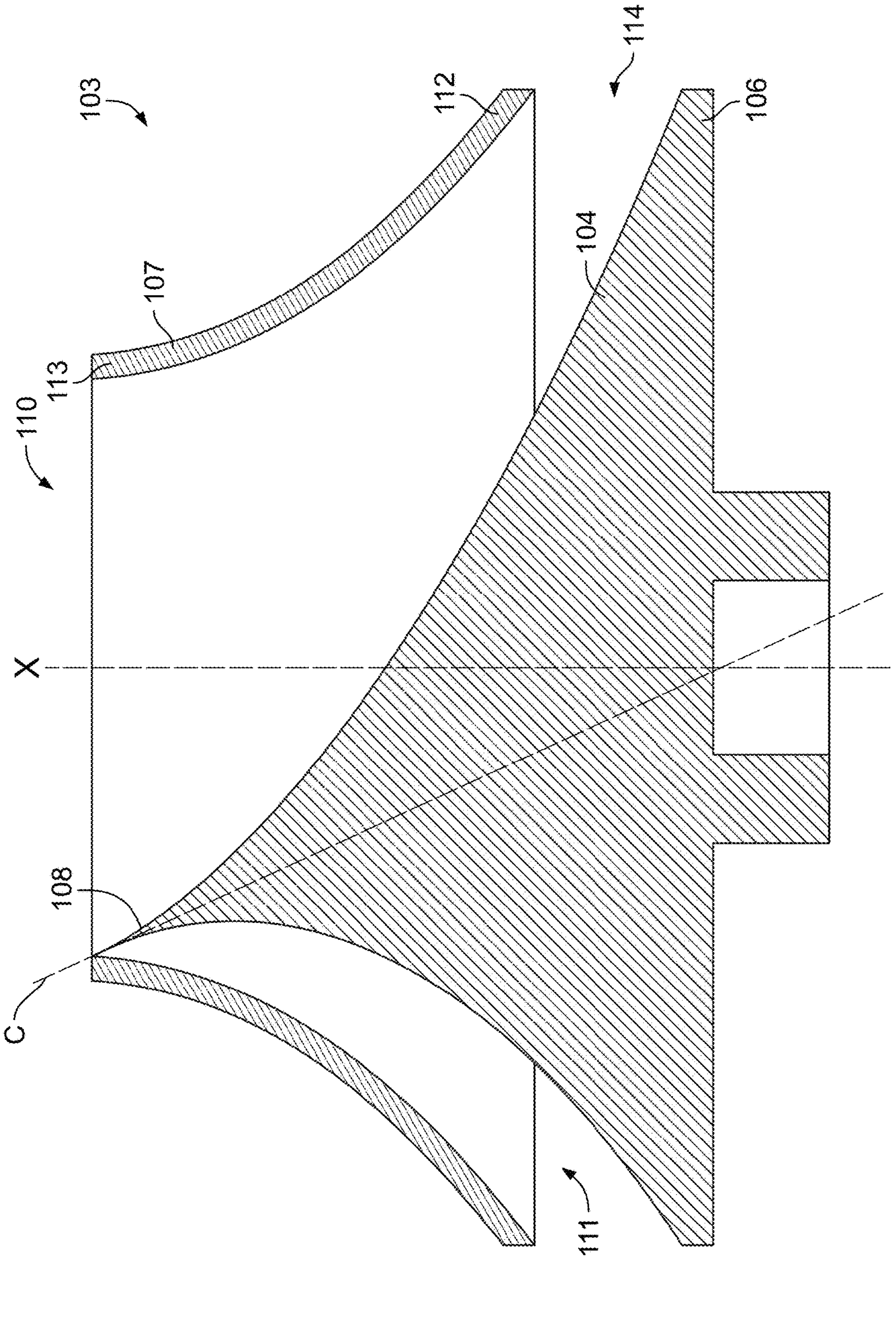
FIG. 3B is a side, partial cross-sectional view of the rear half of the impeller of FIG. 3A taken along a central vertical plane.

FIGS. 3A and 3B show a first embodiment of an impeller 103 for use with the pump 1 of FIGS. 1 and 2. The impeller 103 in FIGS. 3A and 3B includes an impeller body 104 comprising a single oblique cone. During operation of the pump, the impeller body 104 impels the liquid to make it flow from the suction side to the pressure side of the pump 1, similar to blades or vanes of vane impellers.

In the Figures the oblique cone is shown as with triangle mesh hatching, but the impeller body 104 is typically provided as a solid structure with a smooth surface. The impeller 103 has a circular hub base 106 at a bottom of the impeller body 104. The impeller 103 also comprises a flaring shroud or shroud 107 that is concentric with and spaced apart from the hub base 106 along a rotational axis X. The impeller 103 rotates about the rotational axis X during operation.

The impeller body 104 is provided as an oblique cone along an oblique cone axis C and terminates at an eccentric apex 108. The circular hub base 106 of the impeller body 104 is concentric with the rotational impeller axis X. The oblique cone axis C crosses the rotational impeller axis X at the center point of hub base 106. The impeller body 104 is adjacent to and surrounded by an interior surface of the shroud 107. The apex 108 may connect to the interior surface near an upstream edge 113 of the flaring shroud 107. In this way, the impeller body 104 and the shroud 107 form an integral part and rotate together within the housing 2 of the pump 1 during operation.

In an alternative embodiment, the shroud 107 can be separate from the impeller body 104 with a minimized clearance gap between the apex 108 and the inner surface of the shroud 107. In the separated configuration, the shroud 107 is fixed within the housing 2 of the pump 1 and the impeller 103 rotates within the shroud 107. The inner surface of the shroud 107 can be smooth, curved, and radially symmetrical in a manner corresponding to the rotational path of the impeller body 104 about the rotational impeller axis X.

In the embodiment of FIGS. 3A and 3B, the flaring shroud 107 is trumpet-shaped, having an open upstream end 110 and an open downstream end 111, the open downstream end 111 facing the hub base 106. The open upstream end 110 provides a fluid pathway and forms an inflow opening in-line with the pump inlet 6 (shown in FIGS. 1A, 1B) and is coaxial with the rotational impeller axis X. The shroud 107 has a downstream edge 112, which defines the downstream open end 111. The downstream edge 112 has a larger diameter than the upstream edge 113, which defines the open upstream end 110. The downstream edge 112 of the shroud 107 and the circumference of the hub base 106 define an annular outflow opening 114, allowing the impelled liquid to flow into the volute 7 toward the pump outlet 8 (shown in FIGS. 1A and 1B) at the pressure side.

Figure 4A:
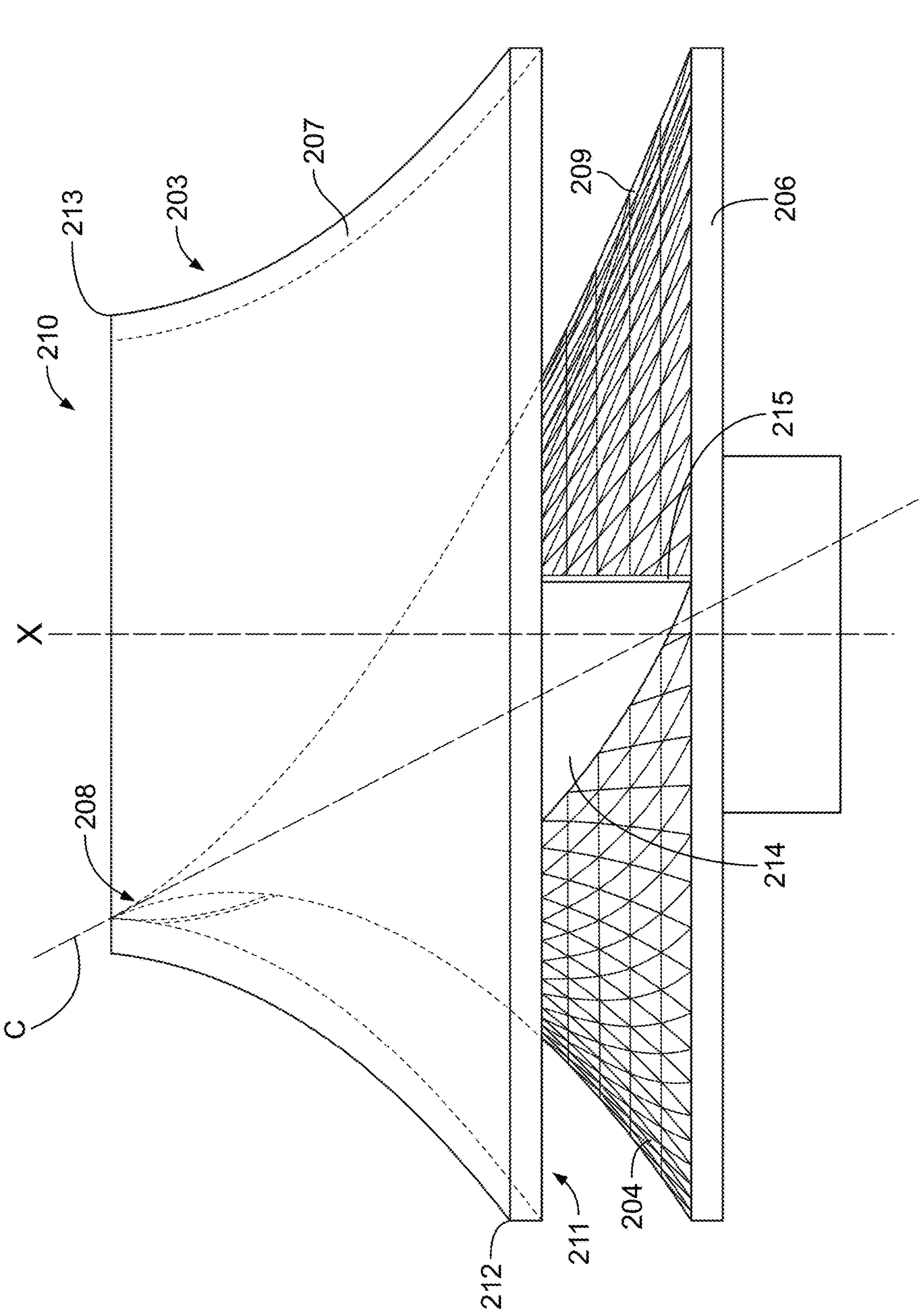
FIG. 4A is a side elevational view of another embodiment of an impeller.
Figure 4B:
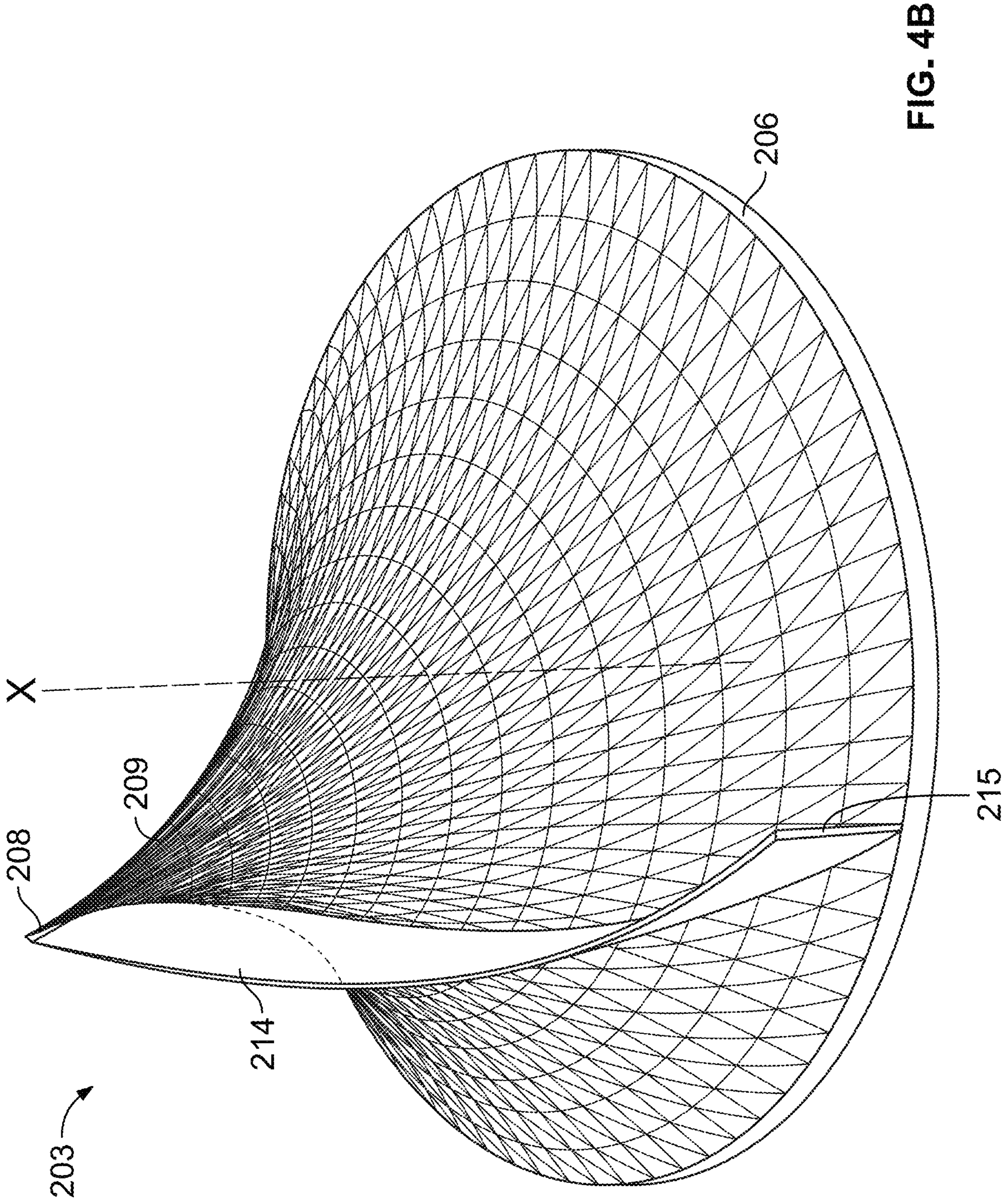
FIG. 4B is an isometric top view of the impeller of FIG. 4A, with a shroud removed for clarity.

FIGS. 4A and 4B show another embodiment of an impeller 203. The impeller 203 has a rotational axis X about which an impeller body 209, provided in the form of an oblique cone, rotates during operation. The impeller body 209 extends along an oblique cone axis C and has an eccentric apex 208. A circular hub base 206 of the impeller body 209 is concentric with the rotational impeller axis X, and the oblique cone axis C crosses the rotational impeller axis X at the hub base 206 at the center point of the hub base 206. The impeller body 209 is surrounded by an inner surface of a shroud 207. In some forms, the apex 208 connects to the inner surface near an upstream edge 213 of the flaring shroud 207. In some forms, the apex 208 is separated from the inner surface by a minimized clearance gap. The shroud 207 is trumpet-shaped, having an open upstream end 210 with an upstream edge 213 and an open downstream end 211 with a downstream edge 212, the open downstream end 211 facing the hub base 106.

The impeller body 209 is provided with a vane 214 that extends from the eccentric apex 208 to the hub base 206 and spirals at least partly around the impeller body 209. In some forms, the vane 214 spirals less than 180 degrees around the impeller body. In some forms, the vane 214 can spiral down from the apex 208 around the impeller body 209 at a spiraling angle between 180 and 270 degrees. In some forms, the vane 214 can spiral down from the apex 208 around the impeller body 209 at a spiraling angle greater than 270 degrees. The vane 214 forms a trailing edge 215 that can bridge the downstream edge 212 of the shroud 207 and the hub base 206. In the shown embodiment, the trailing edge 215 is parallel to the rotational impeller axis X. One longitudinal side of the vane 214 may be attached to the inner surface of the shroud 207 over its full length, while the other longitudinal side of the vane 214 may be attached to the surface of the impeller body 209 over its full length.

In some forms, the vane 214 is not attached to the inner surface of the shroud 207 but is directly adjacent to and slightly offset from the inner surface. In this separated configuration, the shroud 207 is fixed within the housing 2 of the pump 1 (FIGS. 1A, 1B) and the impeller 203 rotates within the shroud 207. In some forms, the vane 214 is sized and shaped to maintain substantially the same offset distance from the inner surface, along the full length of vane 214, over an entire 360 degree rotation of the impeller 203. The inner surface of the shroud 207 can be smooth, curved, and radially symmetrical in a manner corresponding to the rotational path of the impeller body 209 about the rotational impeller axis X. The impeller body 209 and the vane 214 are shown without the shroud 207 in FIG. 4B.

Figure 5A:
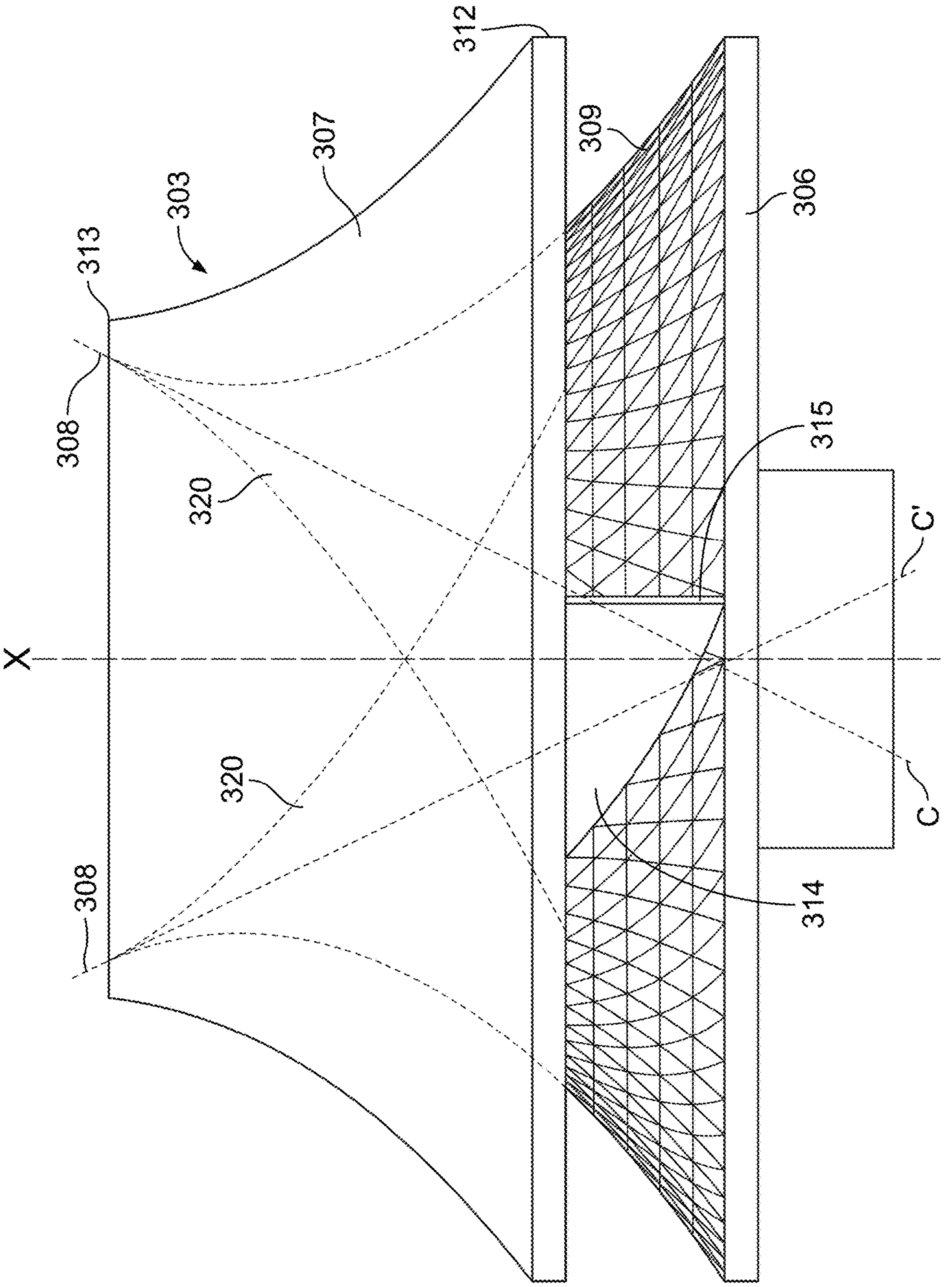
FIG. 5A is a side elevational view of a further embodiment of an impeller.
Figure 5B:
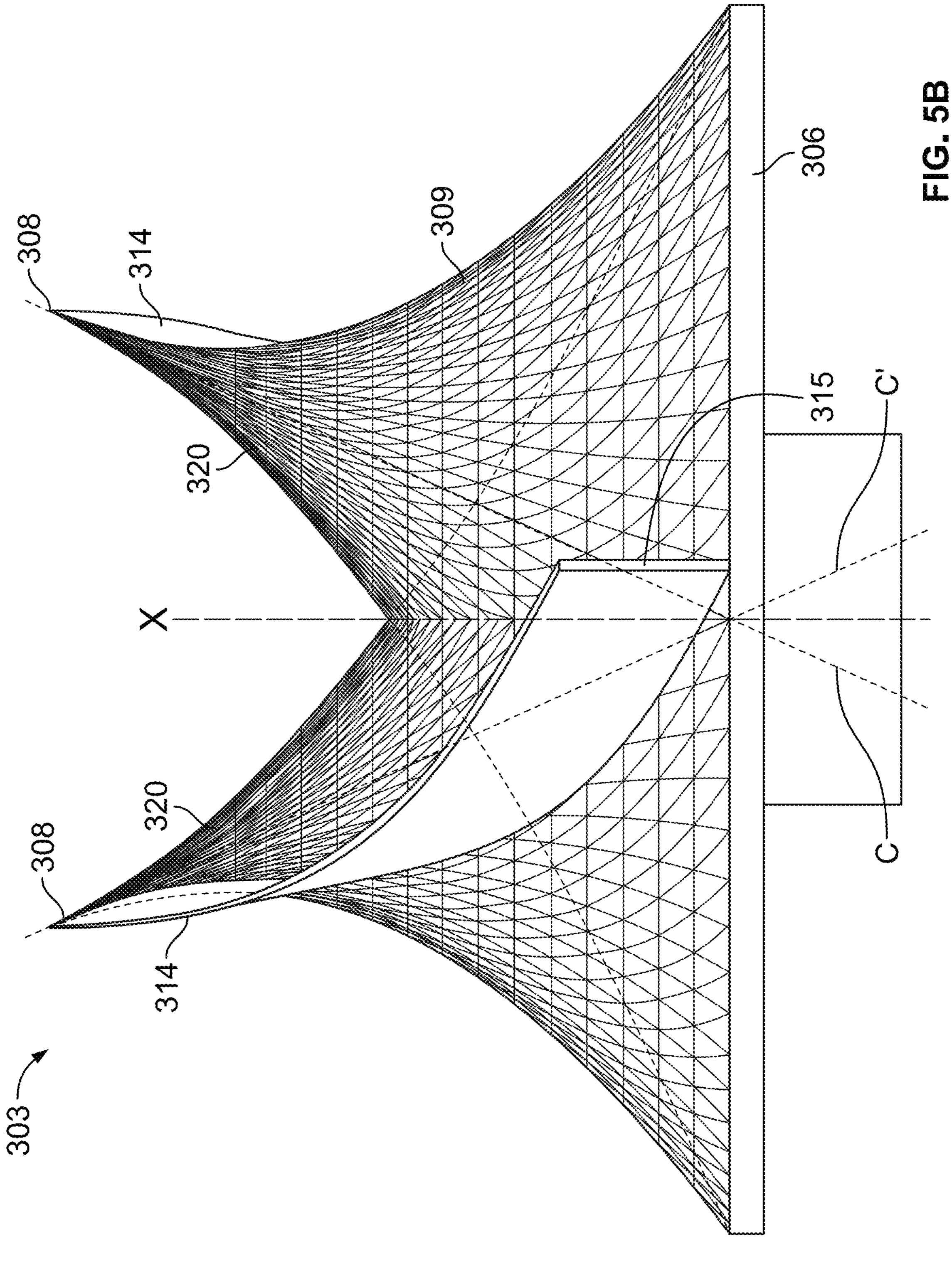
FIG. 5B is side elevational view of the impeller of FIG. 5A, with a shroud removed for clarity.
Figure 5C:
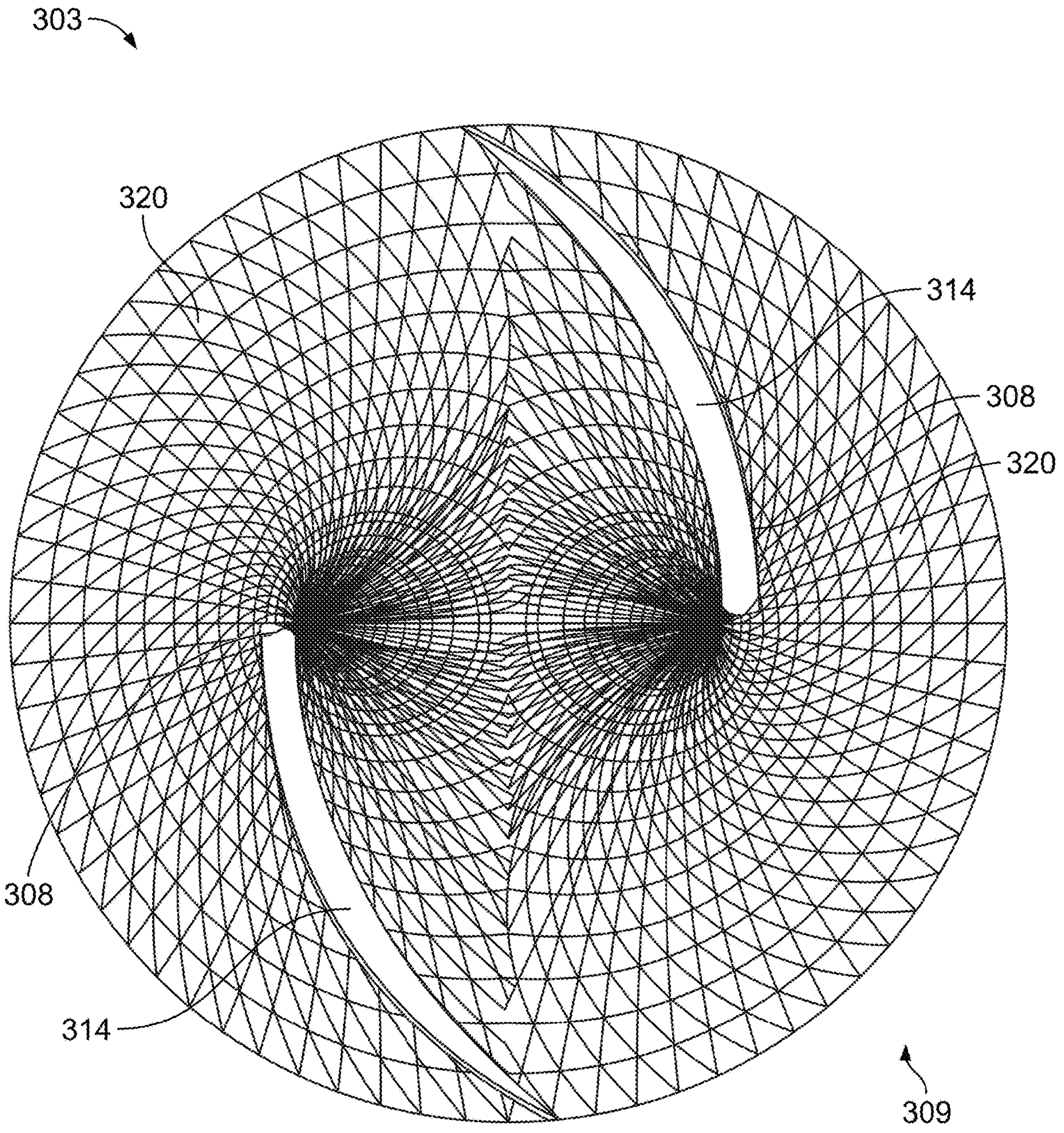
FIG. 5C is a top elevational view of the impeller of FIG. 5B.

FIGS. 5A through 5C show a further exemplary embodiment of an impeller 303. The impeller 303 has an impeller body 309 and a shroud 307, which is similar to the shrouds 107, 207 of the embodiments disclosed above. A side view and a top plan view of the impeller body 309 is shown without the shroud 307 in FIGS. 5B and 5C, respectively. The impeller body 309 is provided in the form of two oblique cones 320, which are each shaped similar to the oblique cone shape of impeller bodies 104, 209 in the embodiments of FIGS. 3A and 4A. The two cones 320 share a concentric base and are substantially the same in size and shape. The cones 320 have oppositely inclined conical axes C, C'. As a result, the impeller body 309 has two symmetrically arranged eccentric apexes 308. The impeller 303 has a rotational axis X about which the impeller body 309 rotates during operation. The oblique cone axes C and C' both cross the rotational impeller axis X at the center point of a hub base 306. The circular hub base 306 of the impeller body 309 is concentric with the rotational impeller axis X. The oblique cones 320 are surrounded by an inner surface of the shroud 307. The apexes 308 can connect to the inner surface near an upstream edge 313 of the flaring shroud 307.

From each of the eccentric apexes 308, a vane 314 spirals down to the base to form a trailing edge 315. In some forms, the trailing edges are arranged on the same plane as the center point of the hub base 306. The two vanes 314 are symmetrically arranged and shaped relative to the rotational impeller axis X. Both vanes 314 are similar to the vane 214 of the embodiment shown in FIG. 4A. For example, the trailing edges 315 can bridge a downstream edge 312 of the shroud 307 and the hub base 306, and the trailing edges 315 can spiral at least partly around the corresponding oblique cone 320. In some forms, the trailing edges 315 spiral less than 180 degrees around the impeller body. In some forms, the trailing edges 315 can spiral down from the apexes 308 around the impeller body 309 at a spiraling angle between 180 and 270 degrees. In some forms, the trailing edges 315 can spiral down from the apexes 308 around the impeller body 309 at a spiraling angle greater than 270 degrees. In the shown embodiment, the trailing edge 315 is parallel to the rotational impeller axis X. One longitudinal side of the vane 314 can be attached to the inner surface of the shroud 307 over its full length, while the other longitudinal side of the vane 314 is attached to the surface of the impeller body 309 over its full length.

In some forms, the vane 314 is not attached to the inner surface of the shroud 307 but is directly adjacent to and slightly offset from the inner surface. In this separated configuration, the shroud 307 is fixed within the housing 2 of the pump 1 (FIGS. 1A, 1B) and the impeller 303 rotates within the shroud 307. In some forms, the vanes 314 are sized and shaped to maintain substantially the same offset distance from the inner surface, along the full length of each vane 314, over an entire 360 degree rotation of the impeller 303. The inner surface of the shroud 307 can be smooth, curved, and radially symmetrical in a manner corresponding to the rotational path of the impeller body 309 about the rotational impeller axis X.

Figure 6A:
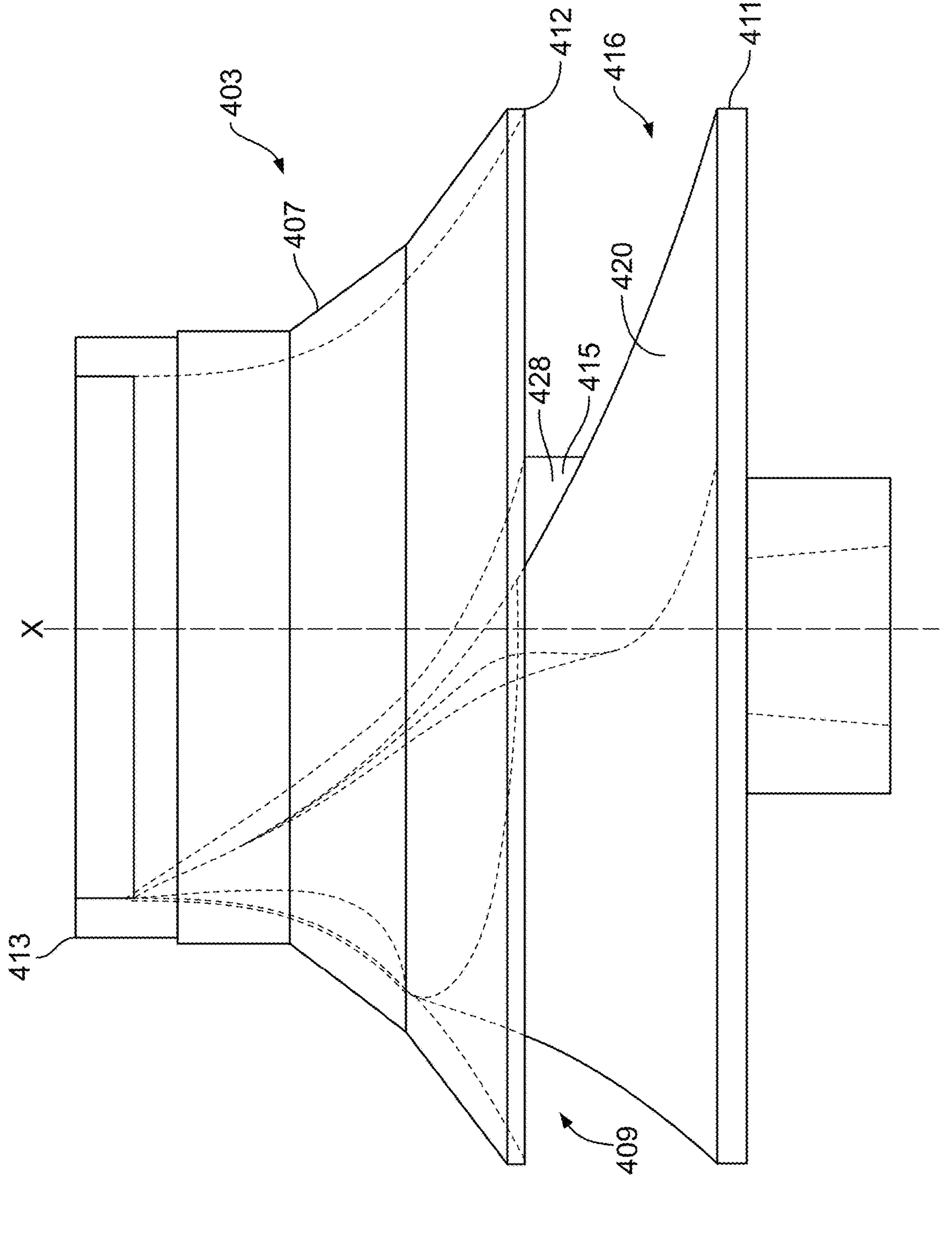
FIG. 6A is a side elevational view of another embodiment of an impeller.
Figure 6B:
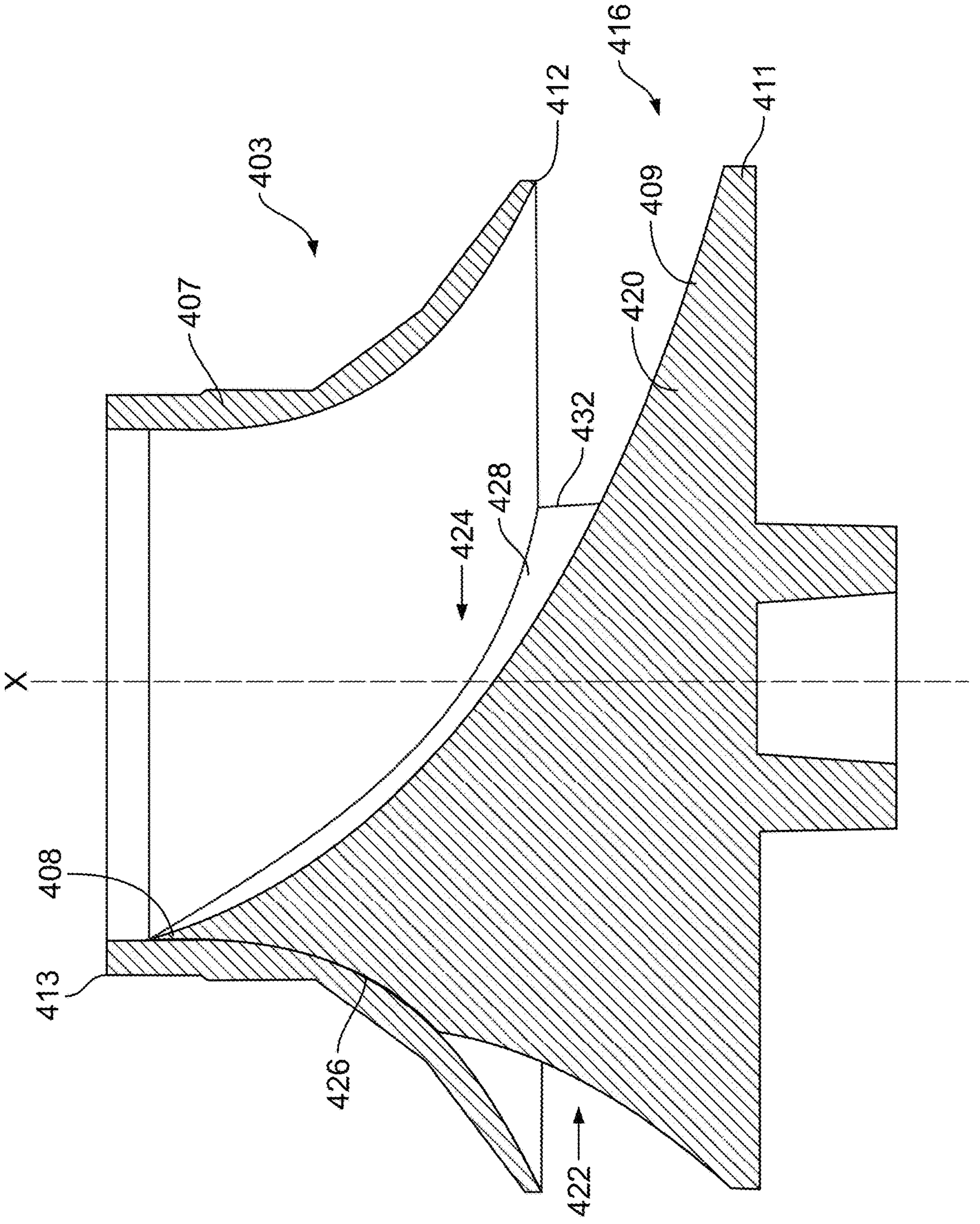
FIG. 6B is a side, partial cross-sectional view of the rear half of the impeller of FIG. 6A taken along a central vertical plane.

FIGS. 6A and 6B shows a further embodiment of an impeller 403, having an impeller body 409 provided as a single oblique cone 420. A ridge 415 of the impeller body 409 extends between the surface of the impeller body 409 and the inner surface of a shroud 407. In this embodiment, the ridge 415 forms part of the conical surface of the impeller body 409 and swirls from the apex 408 down to a downstream edge 412 of the shroud 407 and a hub base 411 at a point 430 to form the trailing edge 417.

The impeller 403 has a rotational axis X about which the impeller body 409 rotates during operation. The circular hub base 411 of the oblique cone 420 is concentric with the rotational impeller axis X. The oblique cone 420 is surrounded by an inner surface of the shroud 407. The apex 408 can connect to the inner surface near an upstream edge 413 of the flaring shroud 407. The inner surface of the shroud 407 can be shaped to correspond to the ridge 415 to facilitate connection between the entire length of the ridge 415 and the inner surface of the shroud 407.

In some forms, the ridge 415 is not attached to the inner surface of the shroud 407 but is directly adjacent to and slightly offset from the inner surface. In this separated configuration, the shroud 407 is fixed within the housing 2 of the pump 1 (FIGS. 1A, 1B) and the impeller 403 rotates within the shroud 407. In some forms, the ridge 415 is sized and shaped to maintain substantially the same offset distance from the inner surface, along the full length of the ridge 415, over an entire 360 degree rotation of the impeller 403. The inner surface of the shroud 407 can be smooth and radially symmetrical in a manner corresponding to the rotational path of the impeller body 409 about the rotational impeller axis X.

FIGS. 7A-E show the impeller body 409 without the shroud 407. As particularly shown in FIGS. 7B and 7C, the oblique cone 420 has an outer slant height 417, which can connect to the inner surface of the shroud 407, and an inner slant height 418 extending between the apex 408 and a point 419 on the circumference of the hub base 411. The oblique cone 420 is more particularly dune shaped, the apex 408 being shaped as a dune crest. The outer slant height 417 is located on a back side 422 of the dune, and the inner slant height 418 is located on a front side 424 of the dune. On a back side 422 of the dune, starting near the apex 408, the oblique cone 420 includes an inwardly curved carve-out 426 that wraps around the oblique cone 420 and extending all the way down the length of the ridge 415. The carve-out 426 can correspond in size and shape to the inner surface of the trumpet-shaped shroud 407. On the front side 424 of the oblique cone 420, a flute-like groove 428 spirals from the apex 408 down the length of the ridge 415.

Figure 7A:
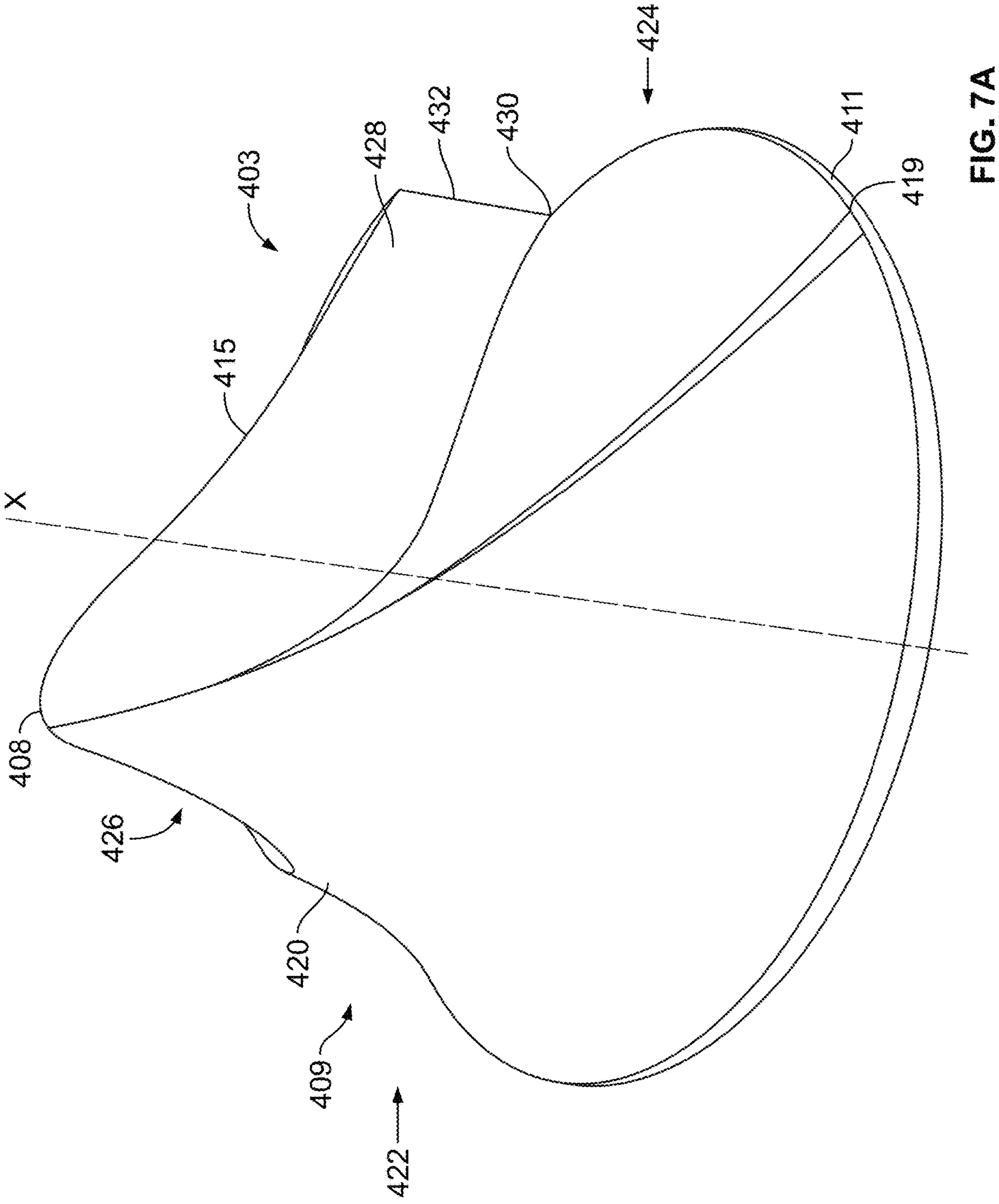
FIG. 7A is an isometric view of the impeller of FIGS. 6A and 6B with a shroud removed for clarity.
Figure 7B:
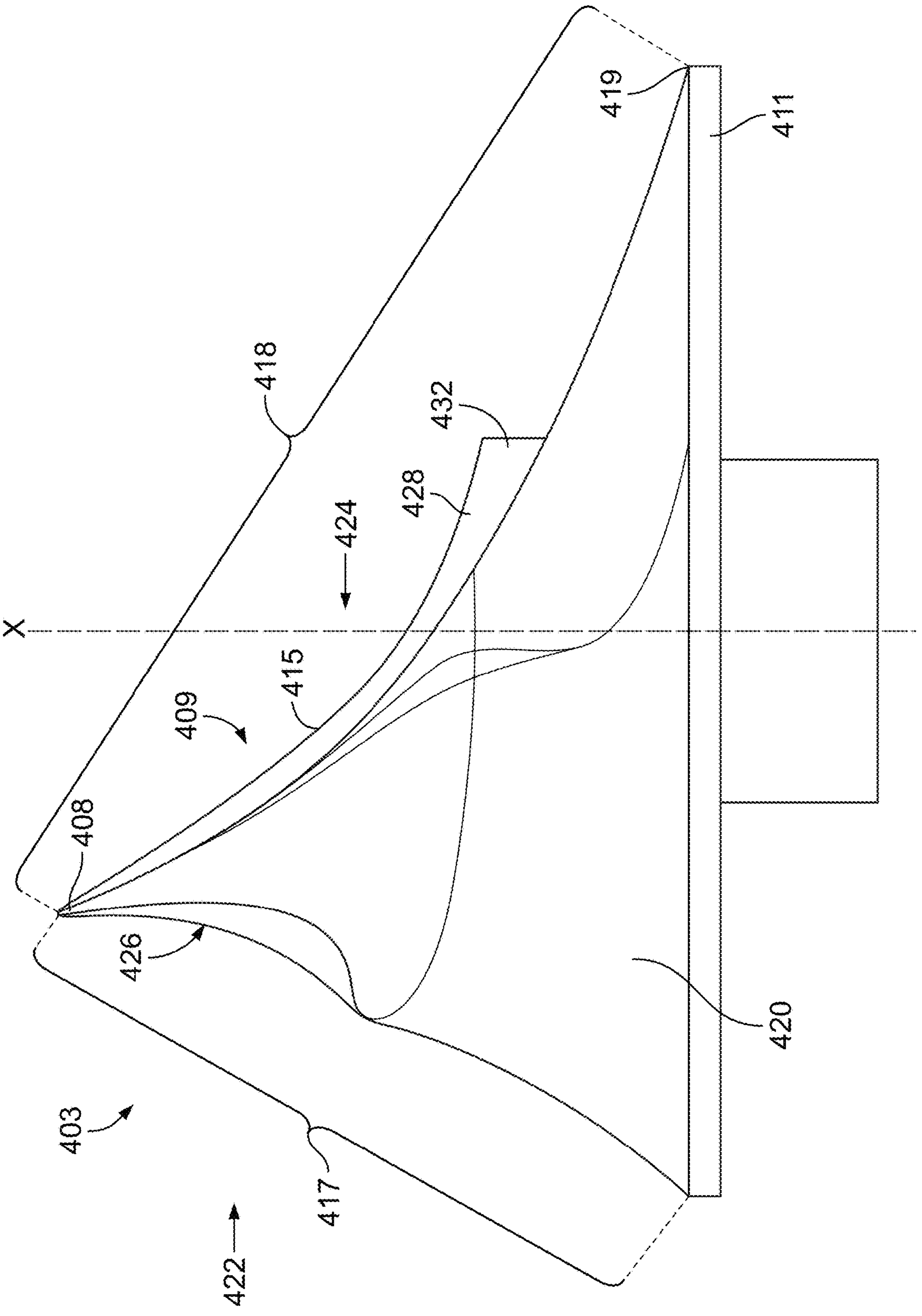
FIG. 7B is a side elevational view of the impeller of FIGS. 6A and 6B with the shroud removed for clarity.
Figure 7C:
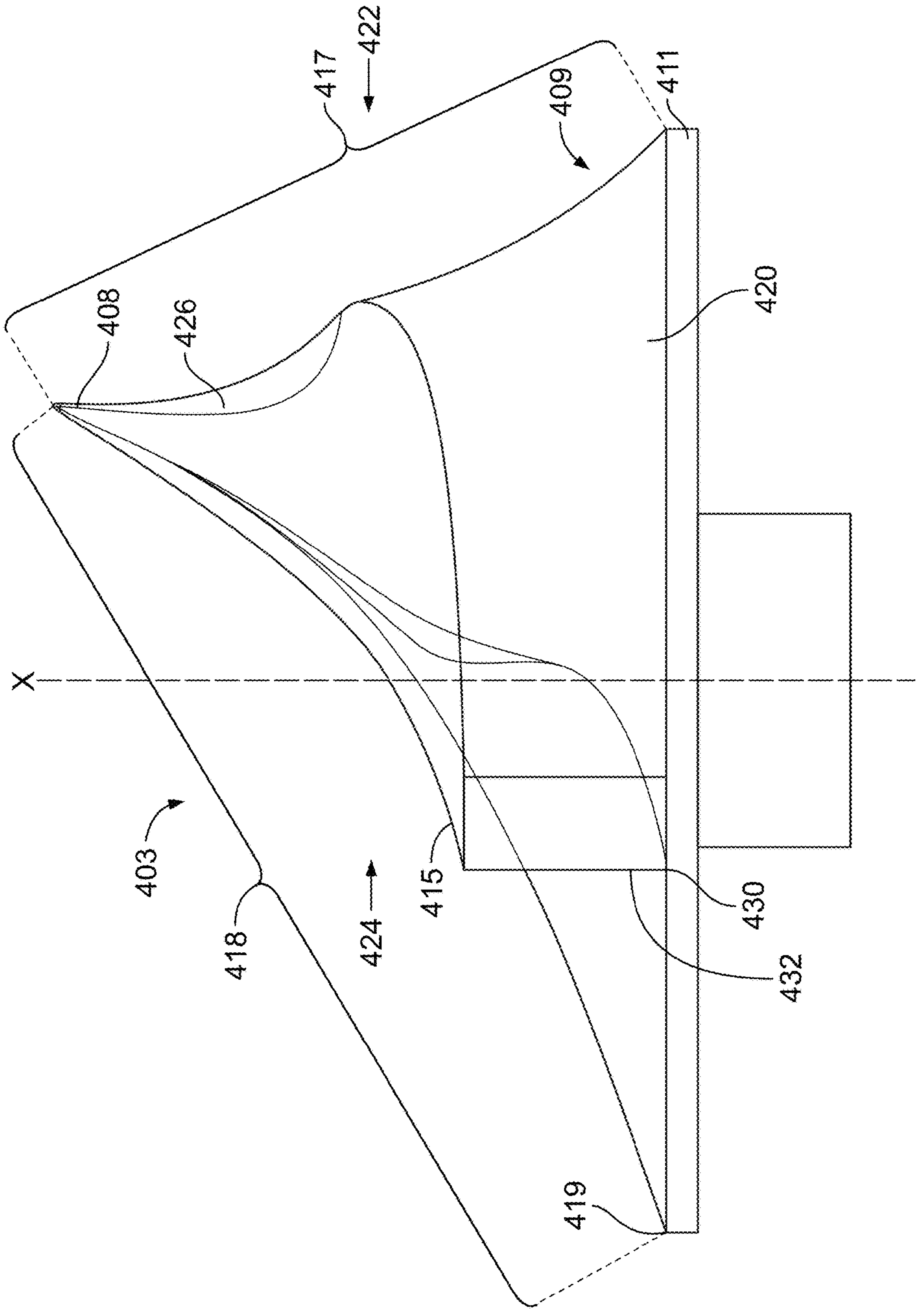
FIG. 7C is another side elevational view of the impeller of FIGS. 6A and 6B with the shroud removed for clarity.
Figure 7D:
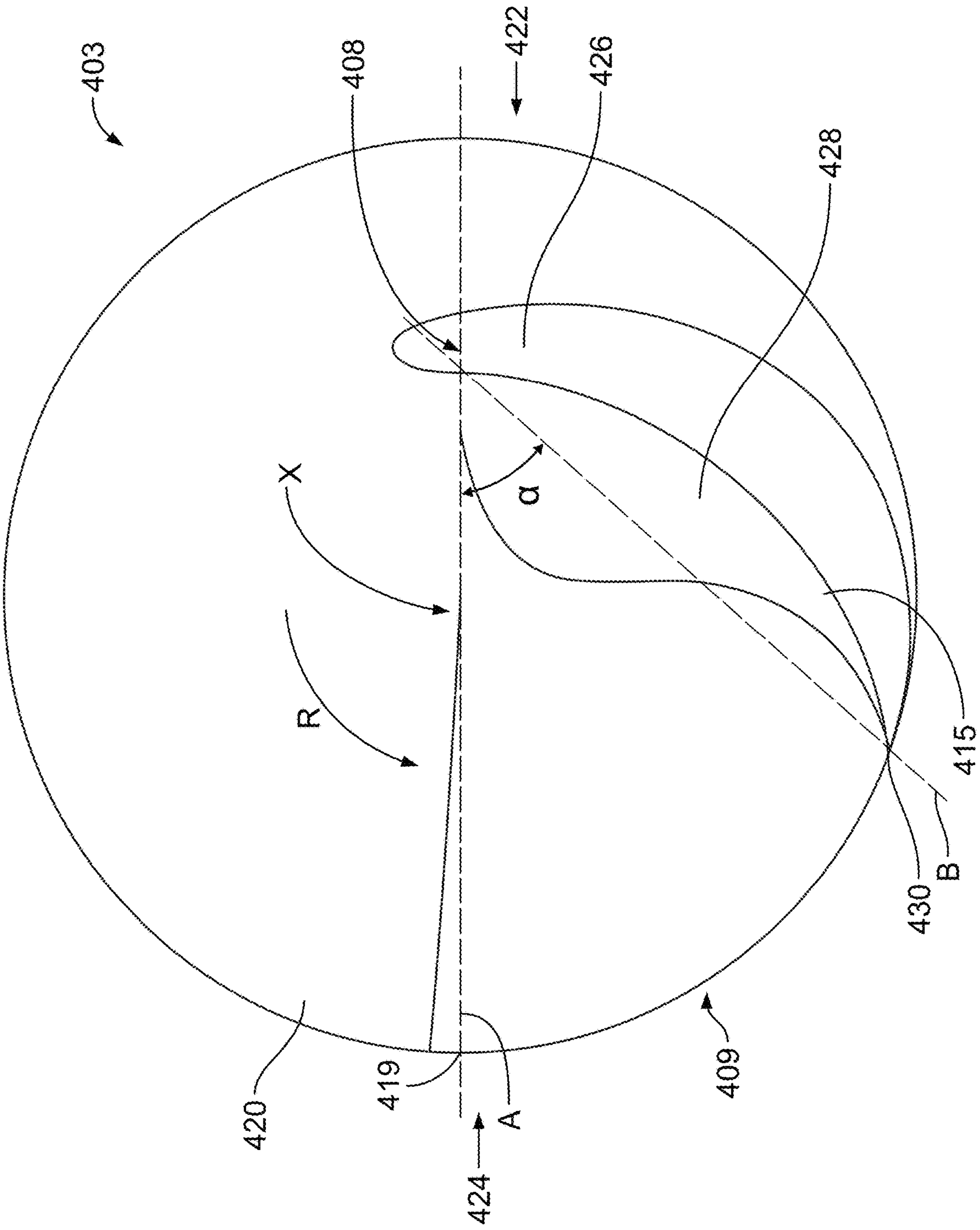
FIG. 7D is a top elevational view of the impeller of FIGS. 6A and 6B with the shroud removed for clarity.
Figure 7E:
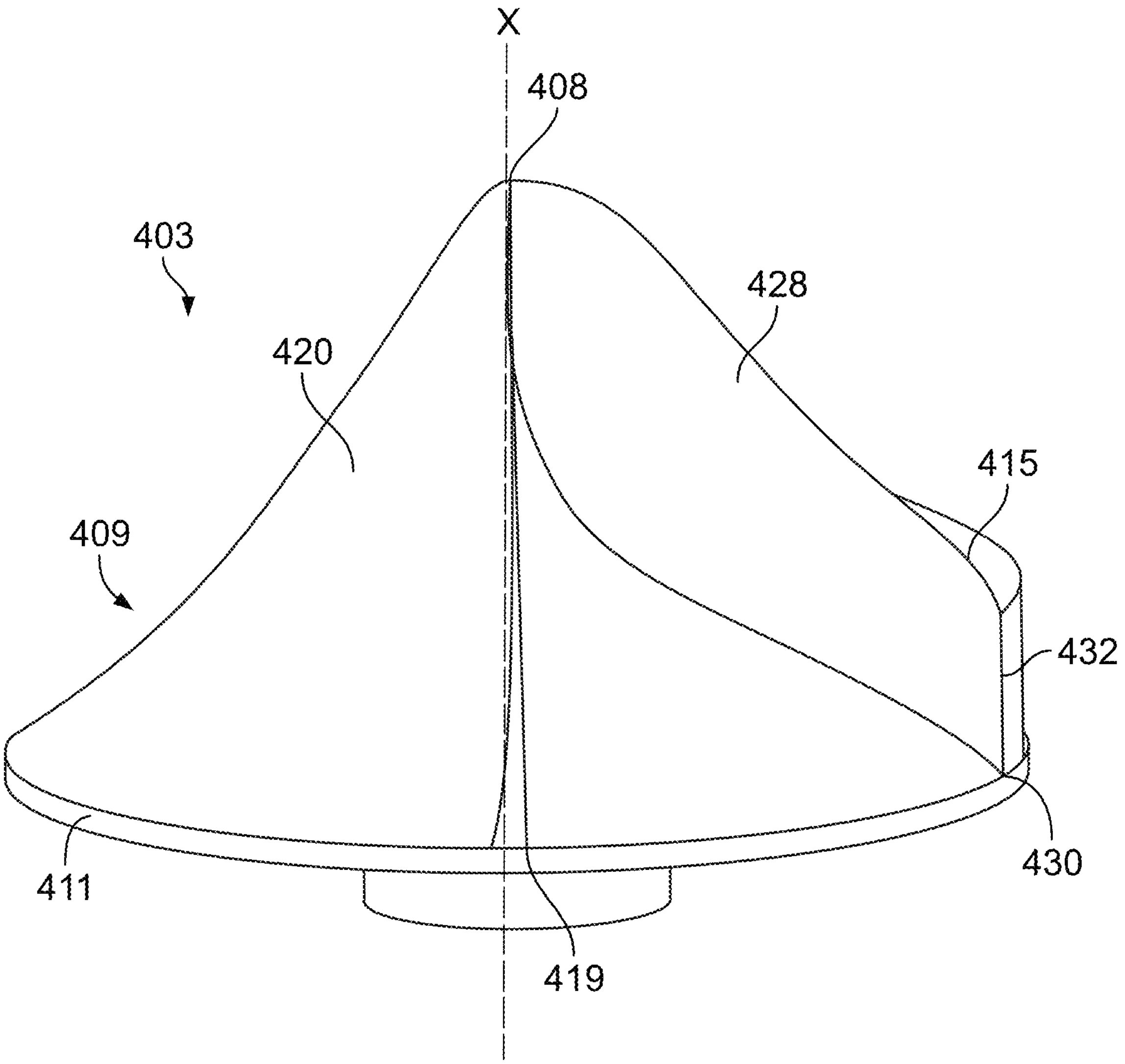
FIG. 7E is a further side elevational view of the impeller of FIGS. 6A and 6B with the shroud removed for clarity.
Figure 8A:
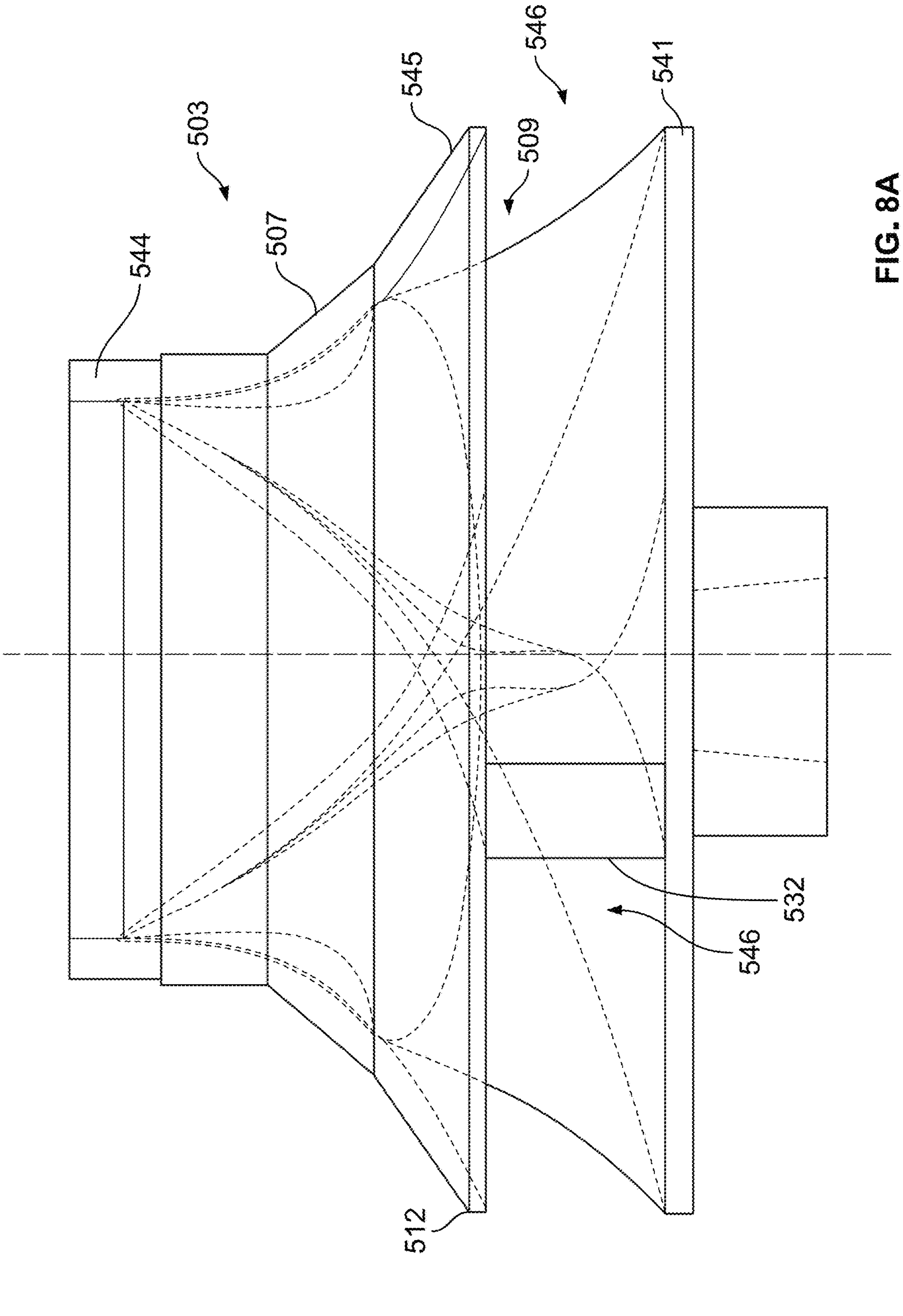
FIG. 8A is a side elevational view of an additional embodiment of an impeller.
Figure 8B:
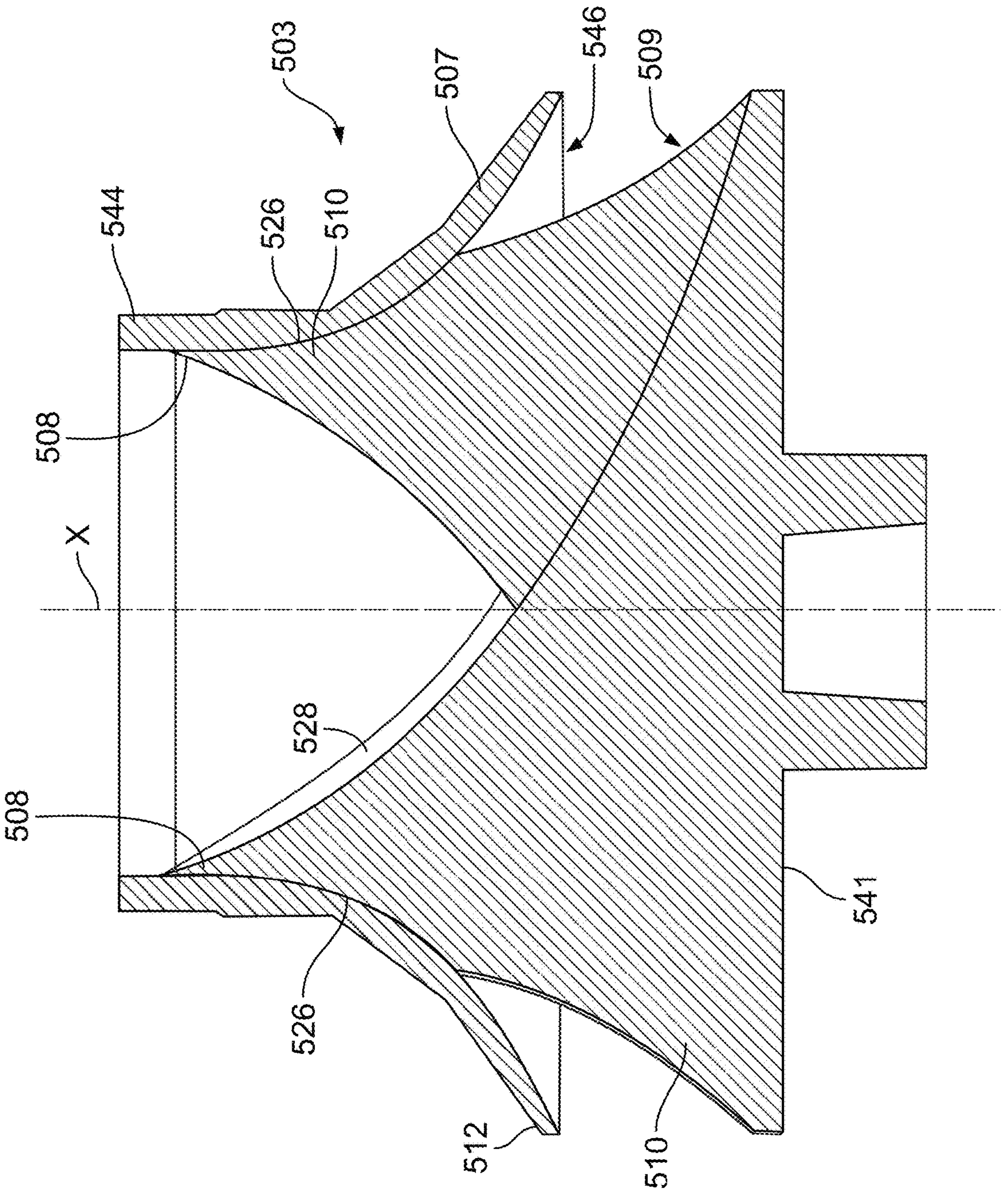
FIG. 8B is a side, partial cross-sectional view of the rear half of the impeller of FIG. 8A taken along a central vertical plane.

The inner slant height 418, the outer slant height 417, and the apex 408 are all coplanar and arranged on a radial plane A (see FIG. 7D). The apex 408 and the point 430 are arranged on a plane B, which extends in the direction of axis X. The angle α between plane A and plane B can be an acute, non-zero angle. In some forms, angle α is substantially equal to 50 degrees. Larger or smaller angles between plane A and plane B can also be used, if so desired. During operation of the pump, the impeller rotates in a direction R as indicated in FIG. 7D. FIGS. 7B and 7C are side views from opposite sides parallel to plane A.

FIGS. 8A through 9D show an impeller 503 having an impeller body 509 comprising two oblique cones 510, similar to the impeller 3 shown in FIGS. 1 and 2. Also, the oblique cones 510 are shaped similar to the single oblique cone 420 of the embodiment shown in FIGS. 6A and 6B. The two oblique cones 510 are in diametrically opposite positions on the impeller 503 and are equally sized but are merged where they cross each other. Each oblique cone 510 has an outer slant height 517, which can connect to the inner surface of a shroud 507, and an inner slant height 518 extending between an apex 508 the circumference of a hub base 541.

The oblique cones 510 are dune shaped and each apex 508 is shaped as a dune crest. The outer slant heights 517 are located on a back side 522 of the dune and the inner slant height 518 is located on a front side 524 of the dune. Starting near the apexes 508, the oblique cones 510 include inwardly curved carve-outs 526 that wrap around each of the oblique cones 510 all the way down the length of ridges 515 on the back side 522 of the dune. The carve-out 526 can correspond in size and shape to the inner surface of the trumpet-shaped shroud 507. On the front side 524 of each oblique cone 510, a flute-like groove 528 spirals from the apex 408 down the length of the ridge 515. The two oblique cones 510 share the same concentric hub base 541 and have eccentric apexes 508, which are symmetrically arranged relative to the rotational impeller axis X. The two apexes 508 are arranged on the same plane as the center point of the hub base 541.

Like the impeller 403 in FIGS. 6A and 6B, the flaring shroud 507 is trumpet-shaped, having a downstream edge 512 having a larger diameter than an upstream edge 544. The downstream edge 512 of the shroud 507 and the circumference of the hub base 541 define an annular flow opening 546. The ridges 515 can bridge a downstream edge 512 of the shroud 507 and the hub base 541. For example, each ridge 515 can be attached to the inner surface of the shroud 307 over its full length.

In some forms, the ridges 515 are not attached to the inner surface of the shroud 507 but are provided directly adjacent to and slightly offset from the inner surface. In this separated configuration, the shroud 507 is fixed within the housing 2 of the pump 1 (FIGS. 1A, 1B) and the impeller 503 rotates within the shroud 507. In some forms, the ridge 515 is sized and shaped to maintain substantially the same offset distance from the inner surface, along the full length of the ridge 515, over an entire 360 degree rotation of the impeller 503. The inner surface of the shroud 507 can be smooth and radially symmetrical in a manner corresponding to the rotational path of the impeller body 409 about the rotational impeller axis X.

Figure 9A:
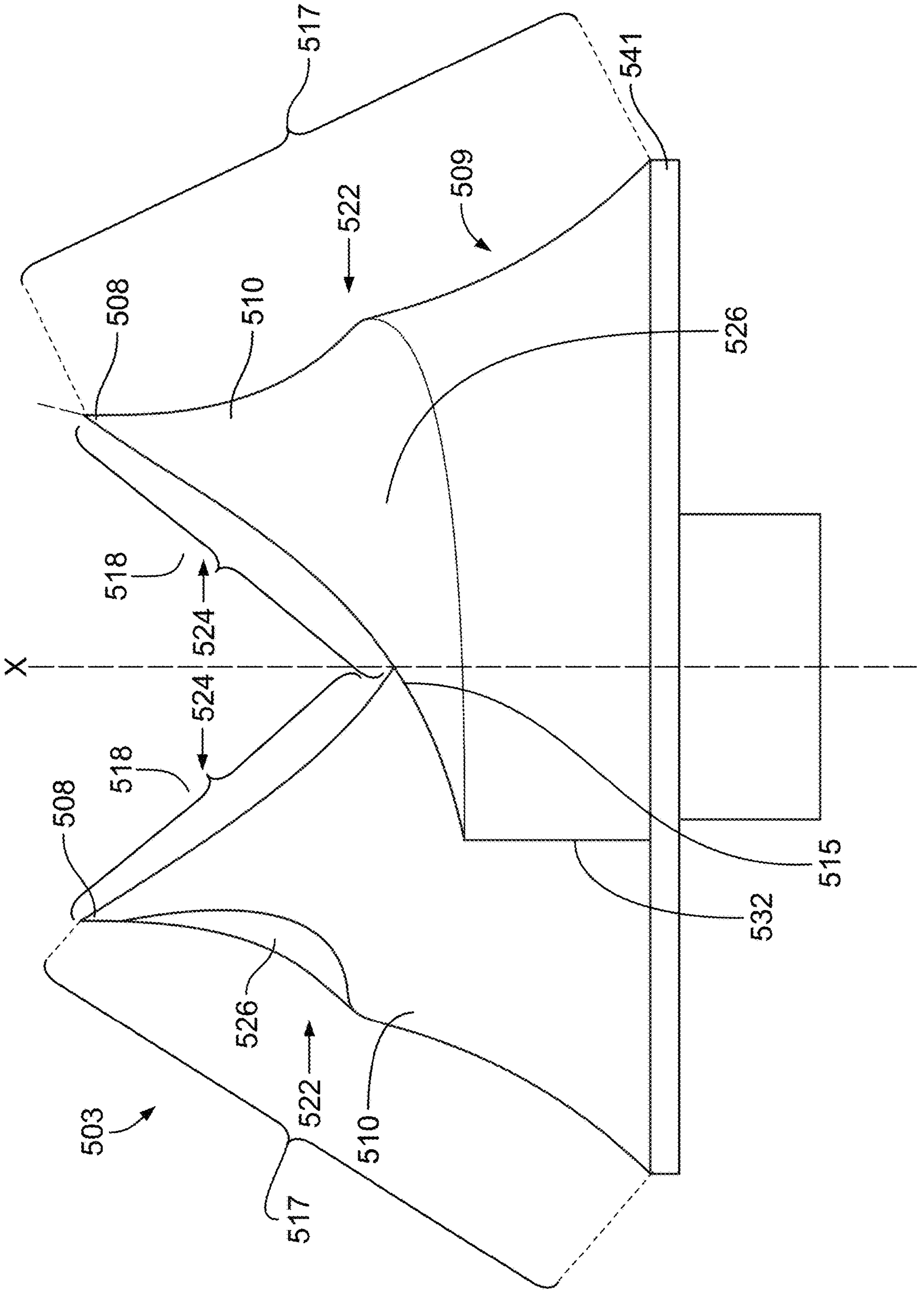
FIG. 9A is a side elevational view of the impeller of FIGS. 8A and 8B with a shroud removed for clarity.
Figure 9B:
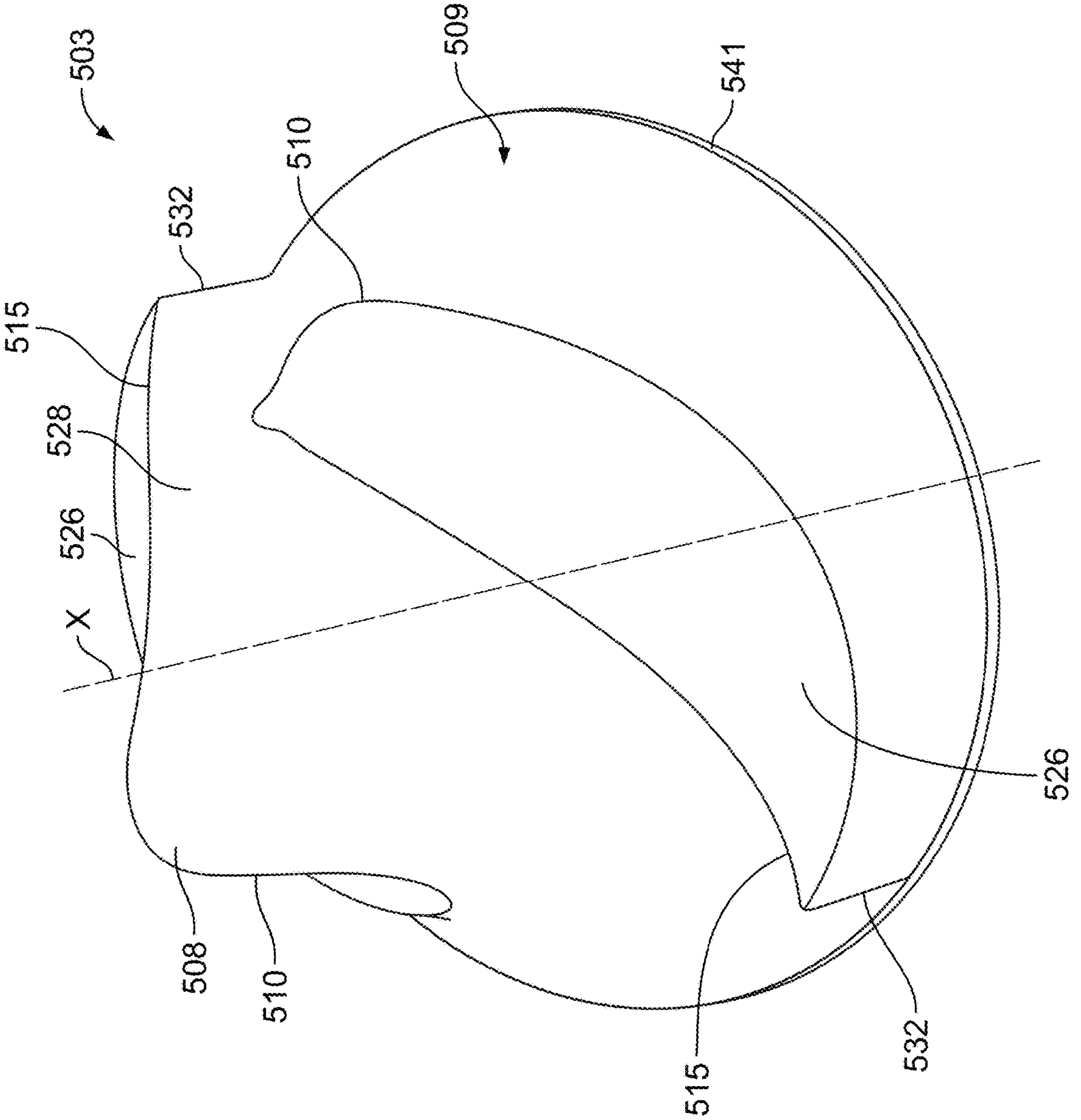
FIG. 9B is an isometric view of the impeller of FIGS. 8A and 8B with the shroud removed for clarity.
Figure 9C:
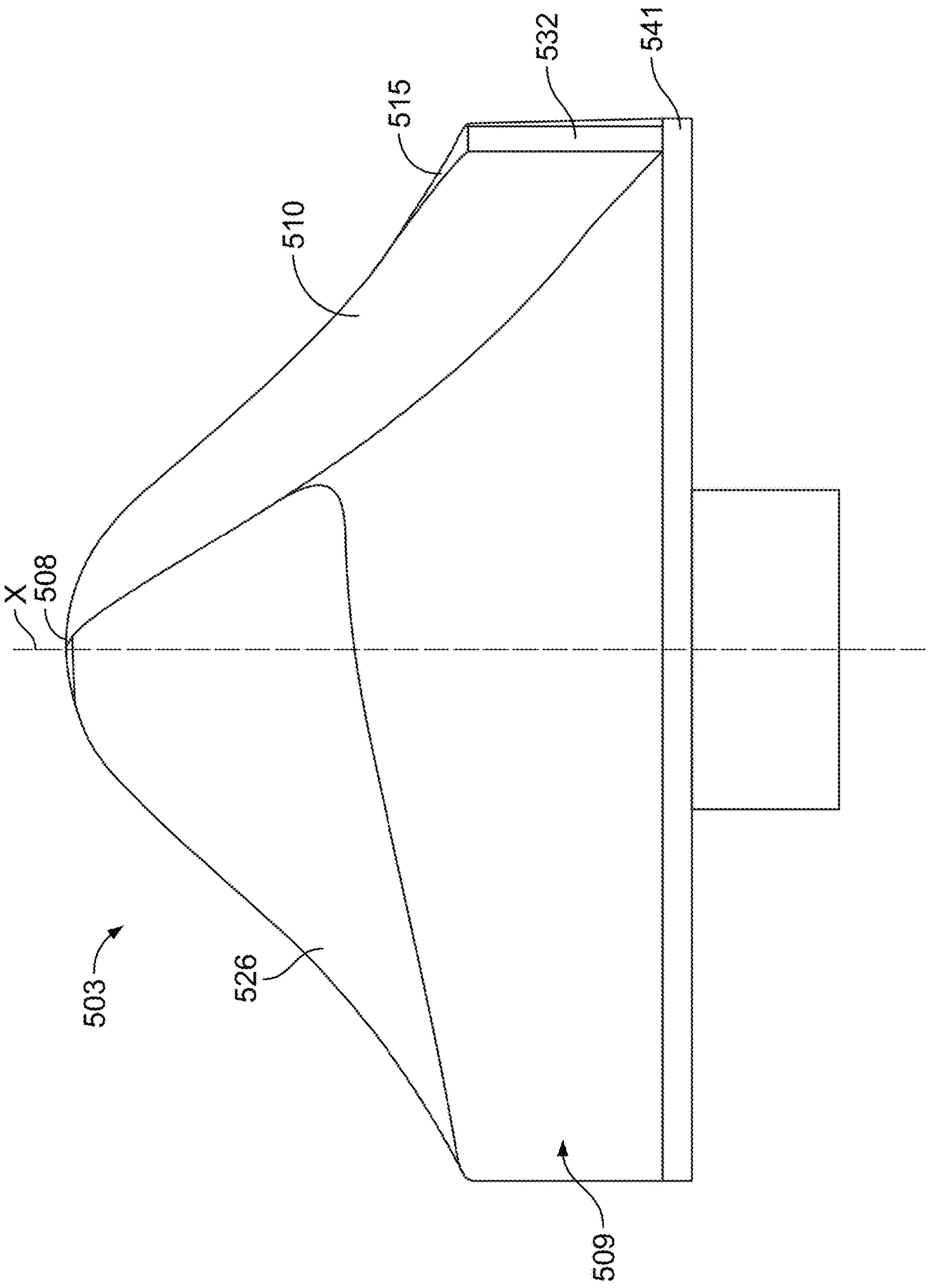
FIG. 9C is another side elevational view of the impeller of FIGS. 8A and 8B with the shroud removed for clarity.
Figure 9D:
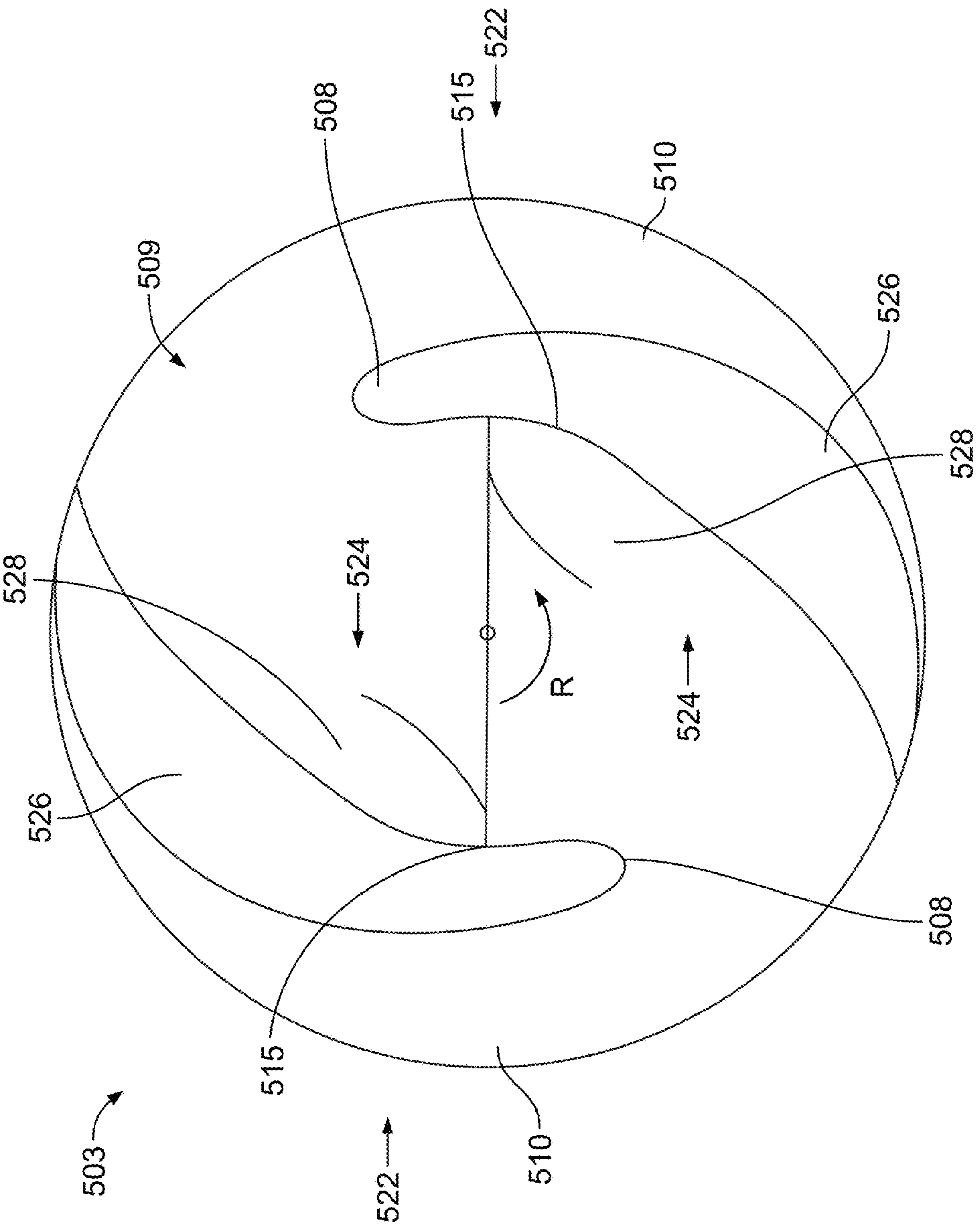
FIG. 9D is a top elevational view of the impeller of FIGS. 8A and 8B with the shroud removed for clarity.

Both impelling bodies 509 have a conical surface twisted to form ridges 515 in the outflow opening 546 at a distance from the radial plane through the apexes 508. The two ridges 515 are at diametrically opposite positions of the impeller 503. The impeller body 509 is bladeless and vaneless, with the ridges 515 being formed by a swirling extension of the surface of the respective oblique cone 510. During operation of the pump, the impeller rotates in a direction R as shown in FIG. 9D.

Figure 10A:
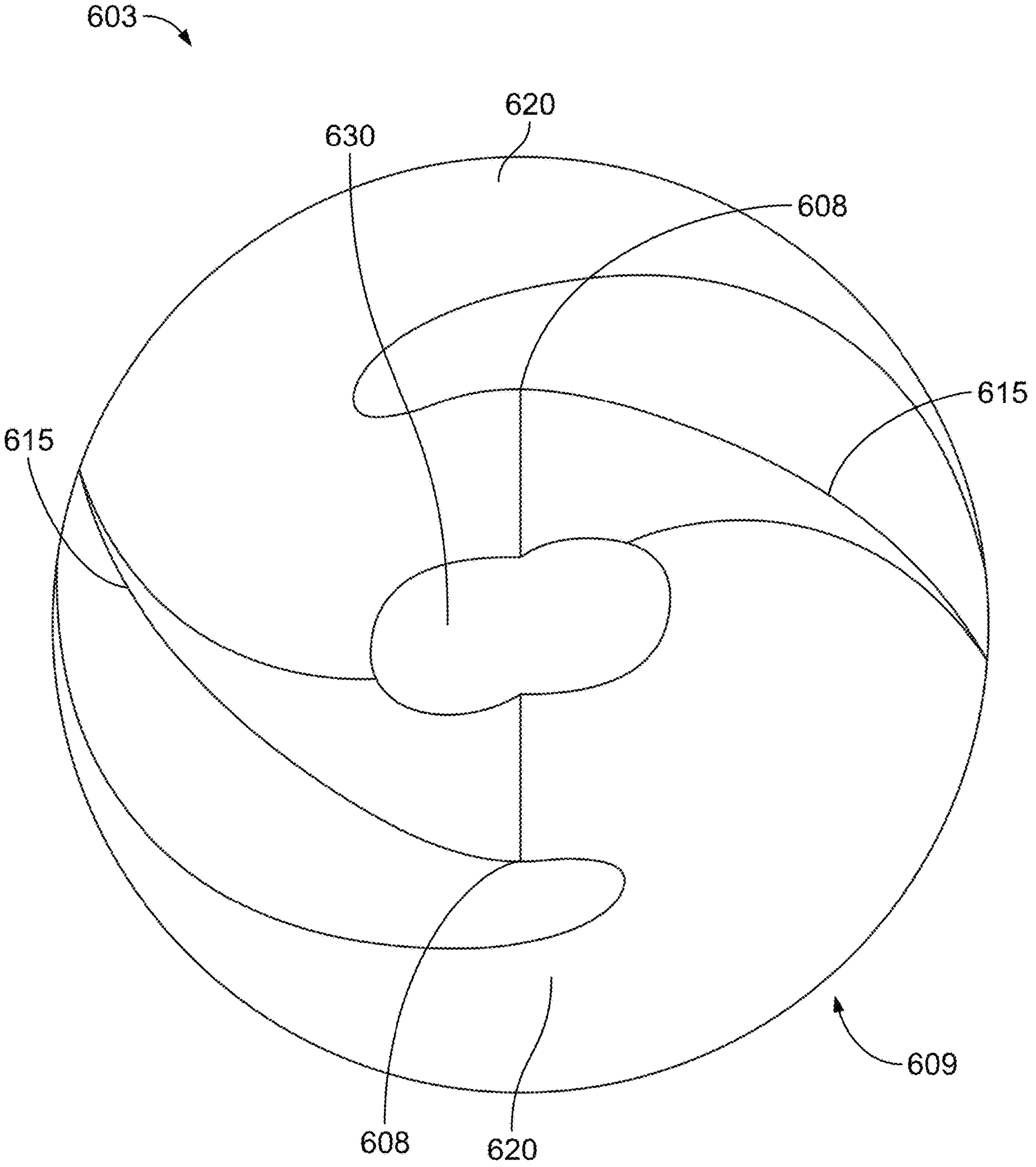
FIG. 10A is a top elevational view of an additional embodiment of an impeller.
Figure 10B:
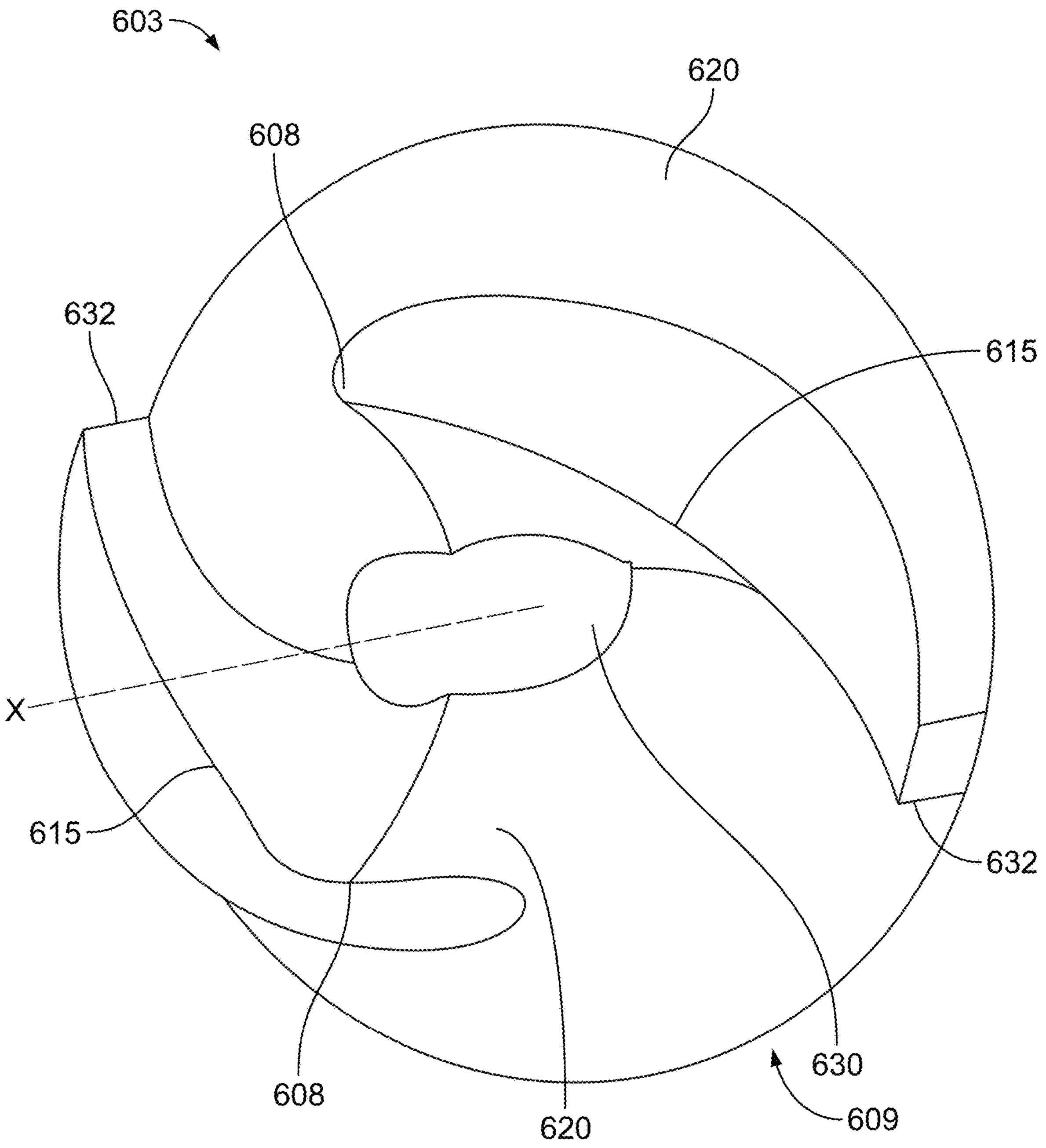
FIG. 10B is an isometric view of the impeller of FIG. 10A.
Figure 11A:
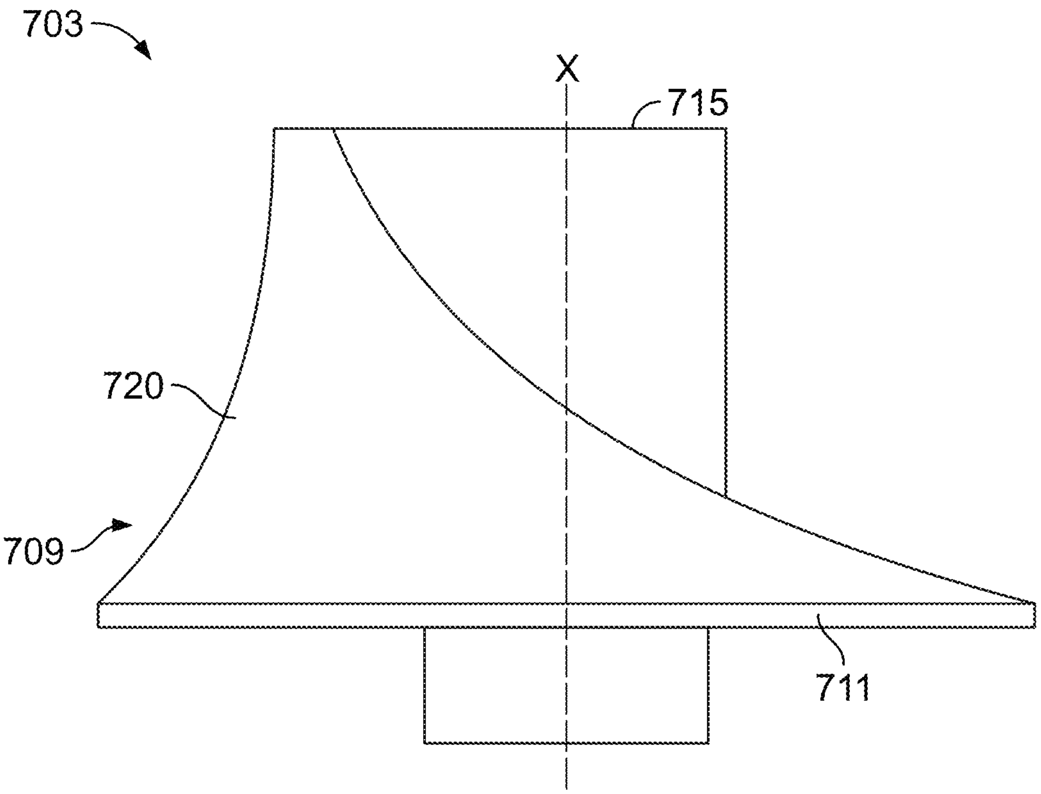
FIG. 11A is a side elevational view of yet a further embodiment of impeller.
Figure 11B:
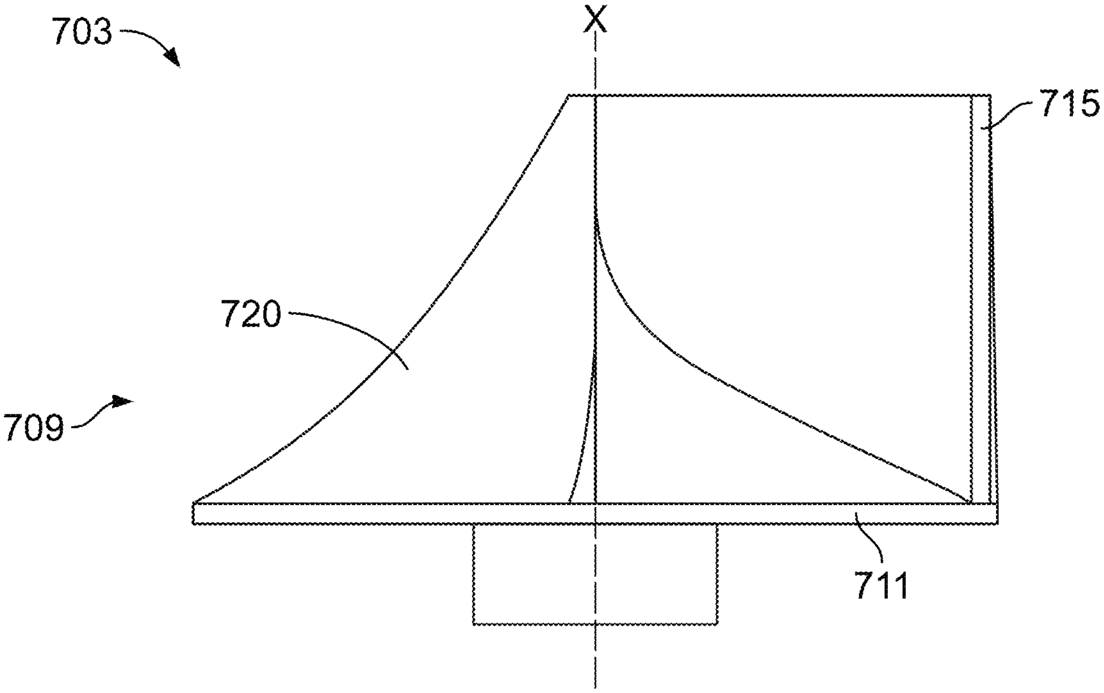
FIG. 11B is a side elevational view of the impeller of FIG. 11A.
Figure 11C:
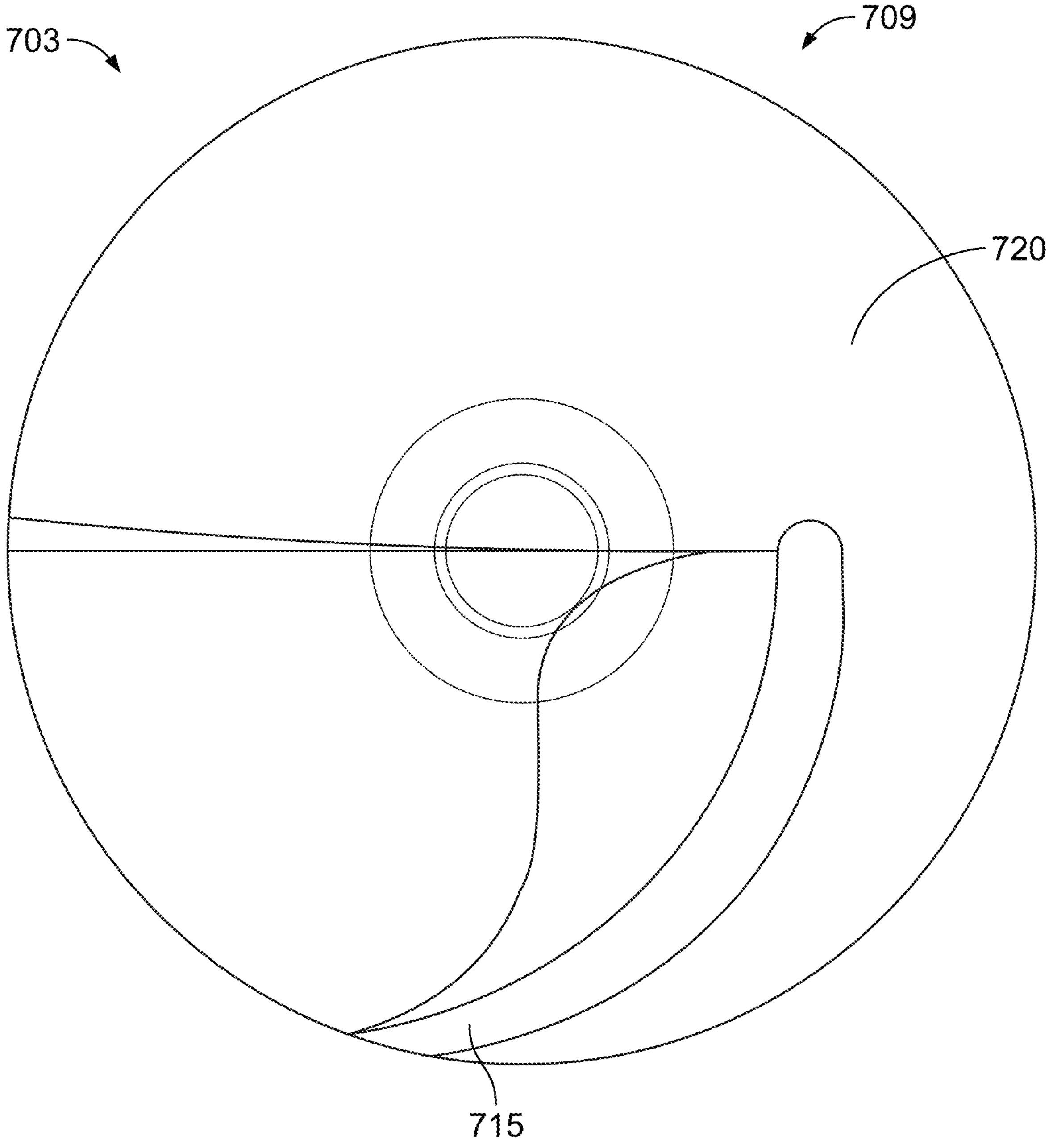
FIG. 11C is a top elevational view of the impeller of FIG. 11A.
Figure 11D:
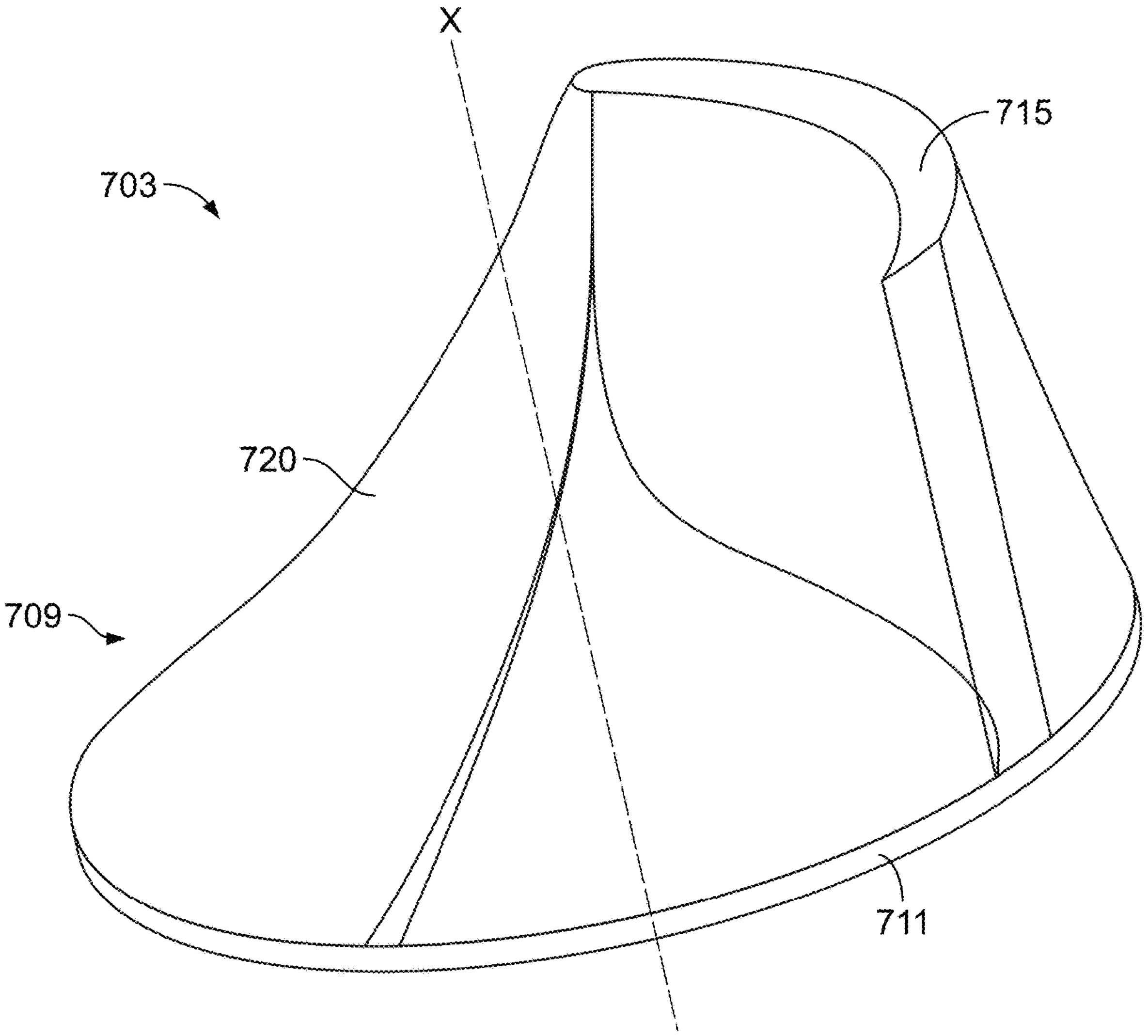
FIG. 11D is an isometric view of the impeller of FIG. 11A.

FIGS. 10A and 10B show an impeller 603 similar to the impeller 503 with one structural modification. The impeller 603 rotates about rotational impeller axis X, includes in impeller body 609 having two opposing oblique cones 620, each oblique cone 620 having a ridge 615 that spirals down from an apex 608. However, impeller 603 also includes a dome 630 formed in the center of the impeller body 609 where two oblique cones 620 merge together. The dome 630 can smooth the edges that are formed by merging the two oblique cones 620 to form the impeller body 609. Also, in some embodiments, the dome 630 is a removable part that covers a fastener that connects the impeller body 609 to a drive shaft of a centrifugal non-clog pump, such as pump 1 (FIGS. 1, 2).

FIGS. 11A through 11D illustrate an impeller 703 according to a different embodiment. The impeller 703 has an impeller body 703 formed as a single oblique cone 720. A ridge 715 of the impeller body 409 extends between the surface of the impeller body 409 and the inner surface of a shroud (not shown). In this embodiment, the ridge 715 forms part of the conical surface and swirls around the outer circumference of a hub base 711. The ridge 715 maintains substantially the same height as the oblique cone 720 along its entire length. The impeller 703 has a rotational axis X about which the impeller body 709 rotates during operation. The circular hub base 711 of the oblique cone 720 is concentric with the rotational impeller axis X.

Figure 12A:
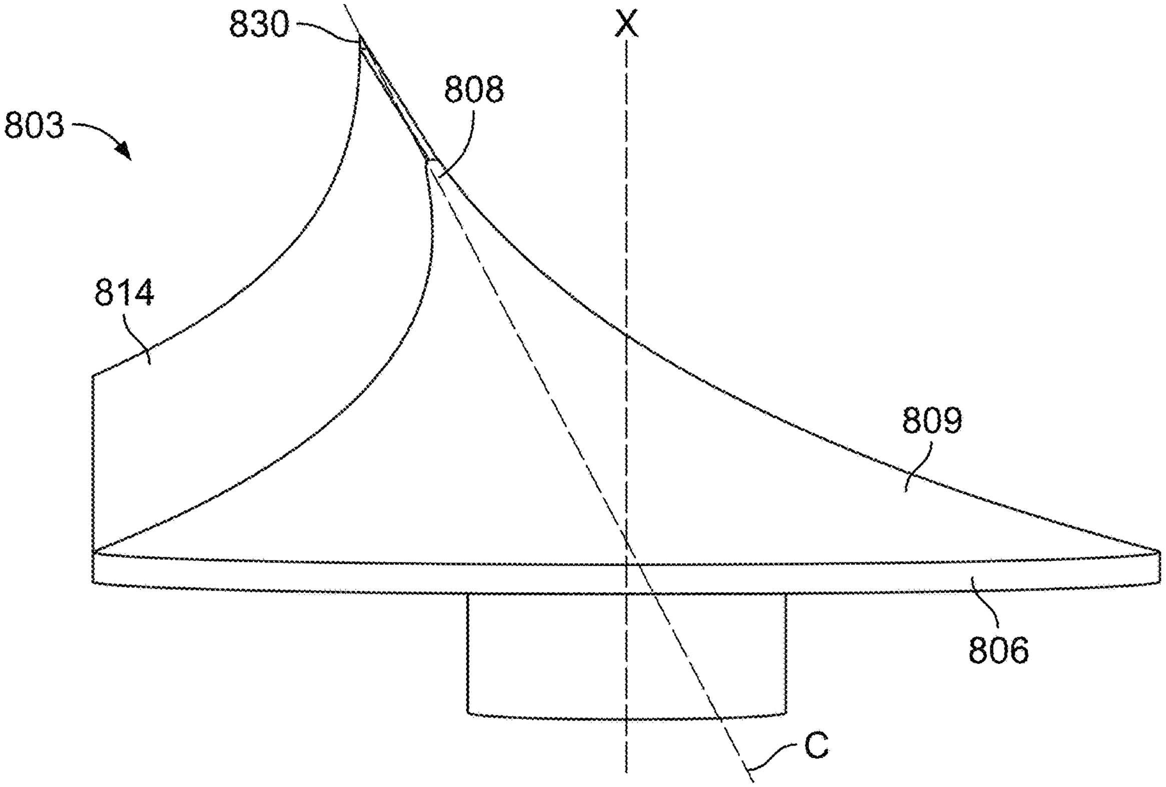
FIG. 12A is a side elevational view of an additional embodiment of impeller.
Figure 12B:
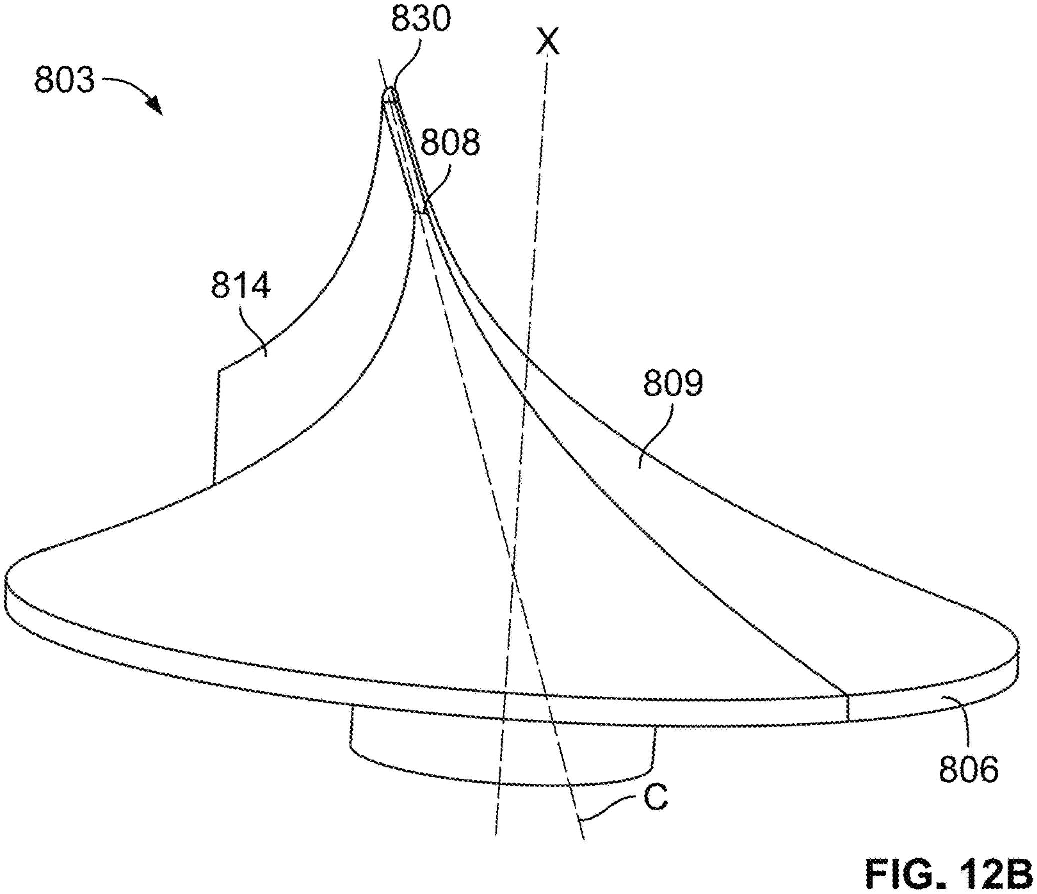
FIG. 12B is an isometric view of the impeller of FIG. 12A.
Figure 12C:
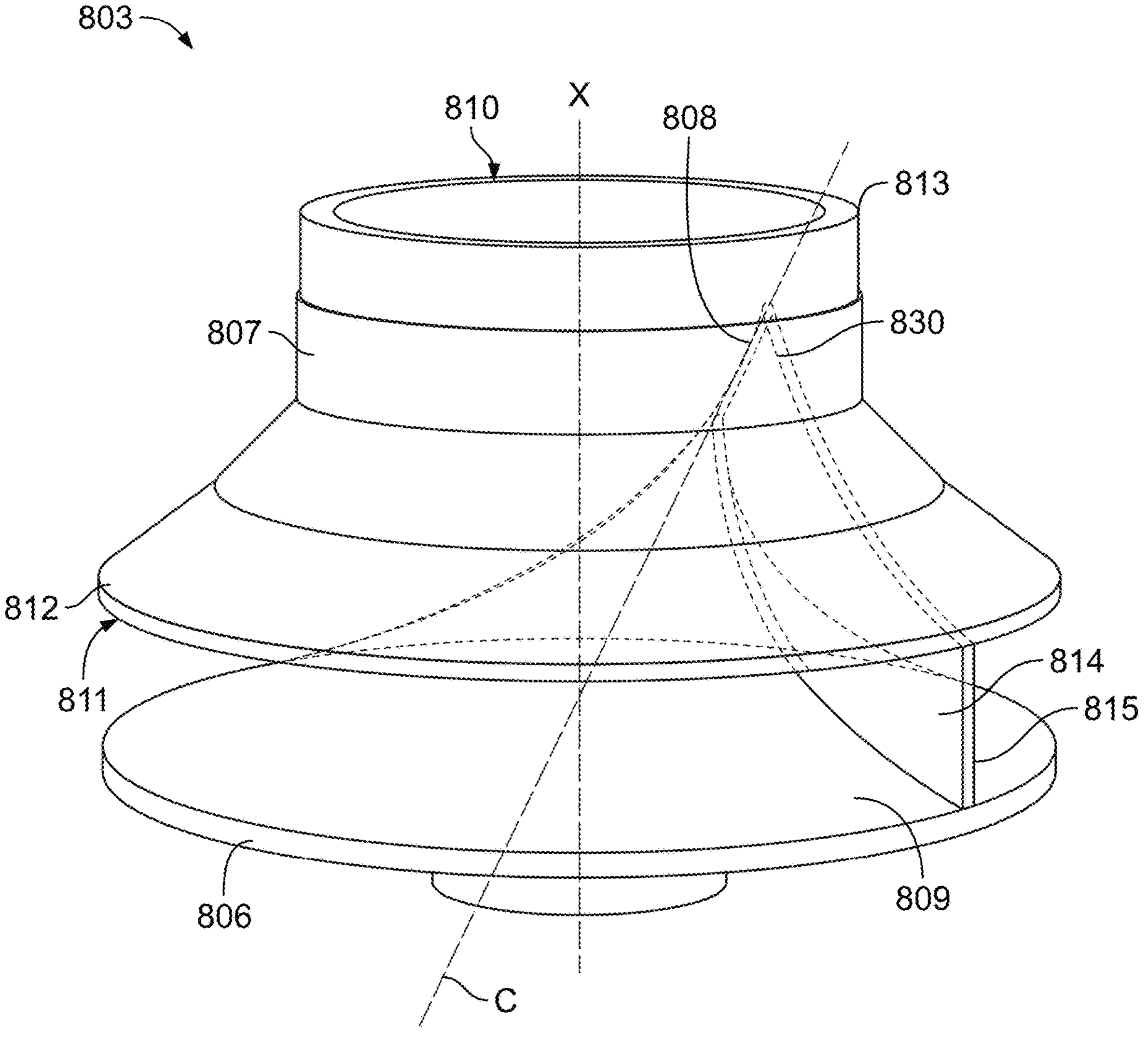
FIG. 12C is a further isometric view of the impeller of FIG. 12A.

FIGS. 12A through 12 C illustrate an impeller 803 according to one embodiment of the invention. The impeller 803 has a rotational axis X about which an impeller body 809, formed as an oblique cone, rotates during operation. The impeller body 809 extends along an oblique cone axis C and has an eccentric apex 808. A circular hub base 806 of the impeller body 809 is concentric with the rotational impeller axis X, and the oblique cone axis C crosses the rotational impeller axis X at the hub base 806 at the center point of the hub base 806. The impeller body 809 is surrounded by an inner surface of a shroud 807. The shroud 807 is trumpet-shaped, having an open upstream end 810 with an upstream edge 813 and an open downstream end 811 with a downstream edge 812, the open downstream end 811 facing the hub base 806.

The impeller body 809 is provided with a vane 814 extending from the eccentric apex 808 to the hub base 806. The vane 814 forms a trailing edge 815 that extends vertically away from the impeller body 809. A vane tip 830 extends away from the apex 808 along the oblique cone axis C. The vane 814 can bridge the downstream edge 812 of the shroud 807 and the hub base 806. In the shown embodiment, the trailing edge 815 is parallel to the rotational impeller axis X. One longitudinal side of the vane 814 can be attached to the inner surface of the shroud 807 over its full length, while the other longitudinal side of the vane 814 is attached to the surface of the impeller body 809 over its full length.

In some forms, the vane 814 is not attached to the inner surface of the shroud 807 but is directly adjacent to and slightly offset from the inner surface. In this separated configuration, the shroud 807 is fixed within the housing 2 of the pump 1 (FIGS. 1A, 1B) and the impeller 803 rotates within the shroud 807. In some forms, the vane 814 is sized and shaped to maintain substantially the same offset distance from the inner surface, along the full length of vane 814, over an entire 360 degree rotation of the impeller 803. The inner surface of the shroud 807 can be smooth, curved, and radially symmetrical in a manner corresponding to the rotational path of the impeller body 809 about the rotational impeller axis X.

EXAMPLE

Figure 13:
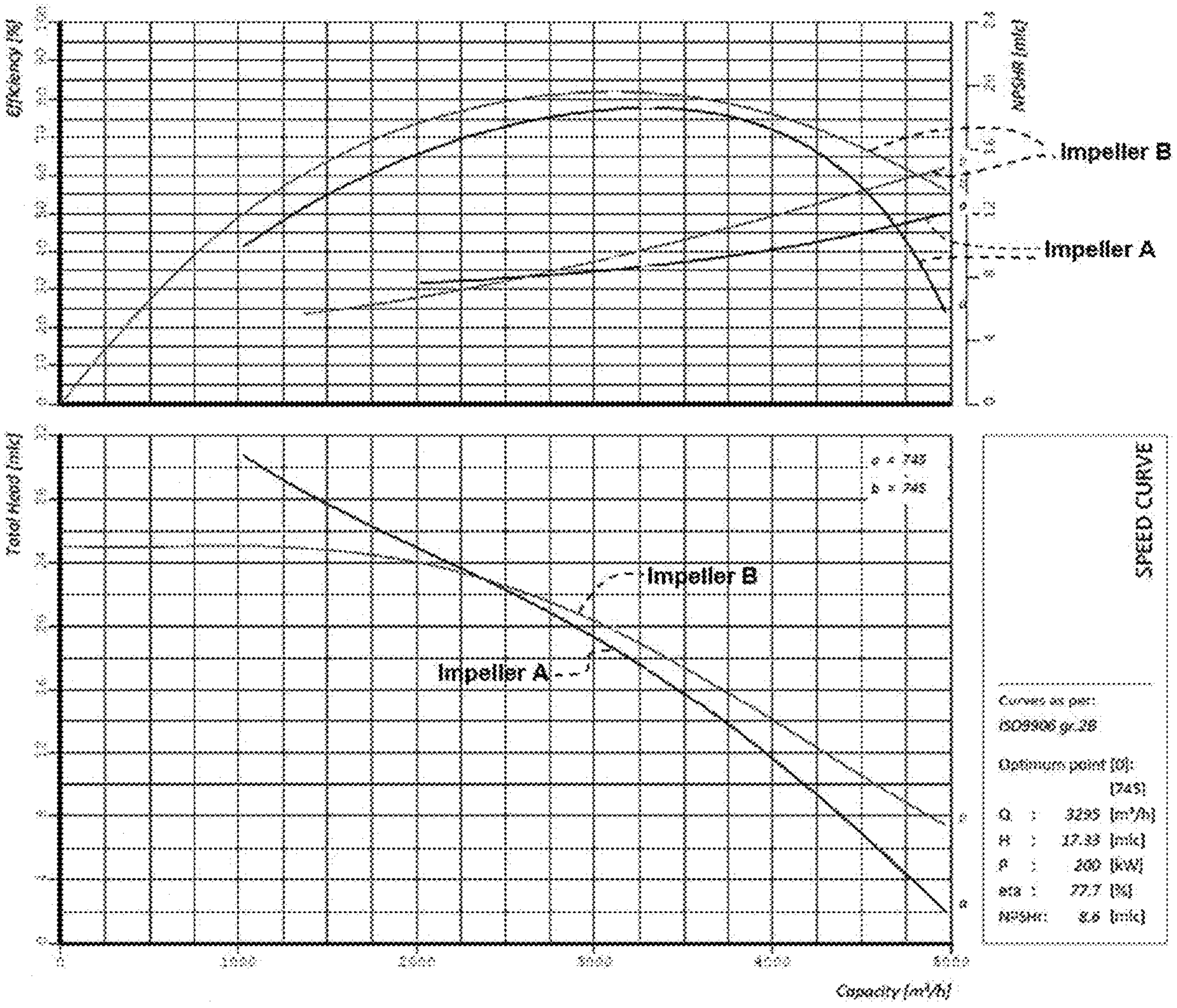
FIG. 13 shows the performance of a prior art impeller as compared to the impeller of FIGS. 10A and 10B.

The following non-limiting example is provided for illustrative purposes only. FIG. 13 illustrates data collected pursuant to an ISO9906 gr. 2B hydraulic performance test. Impeller A is a prior art impeller, Nijhuis HMFr1-60.70S model L839115, which is a three bladed design, with a diameter of approximately 690 mm, a rotational speed of 745 rpm, and optimized for sewage applications (large free passages and optimized blade leading edges). The test impeller B is an impeller according to the embodiment described above with respect to FIGS. 10A and 10B.

Impeller A was utilized in a 4× Nijhuis brand VMFAr1-60.70 pump designed for sewage applications. The discharge and suction size of the pump was approximately 610 mm each and the impeller diameter was approximately 690 mm. The speed of the pump was controlled by VFD and had a maximum rpm of 745-750. The flow at the best efficiency point is about 15,000 GPM and the head at the best efficiency point is about 17 meters.

Impeller B was utilized in a 4× Nijhuis brand VMFAr1-60.70 pump designed for sewage applications. The discharge and suction size of the pump was approximately 610 mm each and the impeller diameter was approximately 690 mm. The speed of the pump was controlled by VFD and had a maximum rpm of 745-750. The flow at the best efficiency point is about 15,000 GPM and the head at the best efficiency point is about 17 meters.

The performance of impeller A and impeller B under substantially the same pump conditions was plotted and is depicted in FIG. 13. As shown in the graph of FIG. 13, the difference in structure of Impeller B from prior art Impeller A results in improved pump performance. More specifically, it was shown that both the efficiency and the (anti-)clogging performance of impeller B are outstanding and superior to impellers of the prior art. Although not depicted in FIG. 13, the impellers of other embodiments were also tested and obtained substantially similar results to that of Impeller B resulting in better efficiency and anti-clogging performance over previously known impellers.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. An impeller assembly comprising:

a shroud having an inner surface flaring outwardly from an inlet toward an outlet; and an impeller body extending into the shroud, the impeller body having an eccentric apex that is fixedly connected to the inner surface of the shroud proximate an upstream edge of the inlet.

2. The impeller assembly of claim 1, wherein the impeller body has a helical ridge shaped to correspond to the inner surface of the shroud.

3. The impeller assembly of claim 2, wherein the helical ridge extends from the eccentric apex to a base of the impeller body.

4. The impeller assembly of claim 2, wherein the helical ridge is connected to the inner surface from the upstream edge to the outlet.

5. The impeller assembly of claim 1, wherein the impeller body defines an inwardly-curved carve out shaped to correspond to the inner surface.

6. The impeller assembly of claim 5, wherein a portion of the impeller body is joined to the shroud along the inwardly-curved carve out.

7. The impeller assembly of claim 1, wherein at least a portion of the impeller body is integral with the shroud.

8. An impeller assembly comprising:

a shroud having an inner surface; and an impeller body fixedly attached to and at least partially enshrouded by the shroud, the impeller body including an oblique cone shaped to correspond to the inner surface.

9. The impeller assembly of claim 8, wherein the oblique cone has a helical ridge shaped to correspond to the inner surface of the shroud.

10. The impeller assembly of claim 9, wherein the helical ridge is connected to the inner surface from an inlet to an outlet of the shroud.

11. The impeller assembly of claim 8, wherein the inner surface is connected to the impeller body along an inwardly-curved carve out of the oblique cone.

12. The impeller assembly of claim 8, wherein the oblique cone is asymmetrically concave.

13. The impeller assembly of claim 8, wherein the inner surface and a portion of the oblique cone define an offset distance from one another that narrows from an inlet to an outlet of the shroud.

14. The impeller assembly of claim 8, wherein the impeller body is integral with the shroud.

15. An impeller assembly comprising:

a shroud having a flared inner surface; and an impeller body at least partially disposed within and connected to the shroud, the impeller body defining a rotational axis and having a plurality of fluid drivers, each fluid driver having an apex offset from the rotational axis, and a helical vane extending radially outwardly and shaped to correspond to the flared inner surface.

16. The impeller assembly of claim 15, wherein the plurality of fluid drivers are radially symmetrical about the rotational axis.

17. The impeller assembly of claim 16, wherein the plurality of fluid drivers is two fluid drivers opposing one another.

18. The impeller assembly of claim 15, wherein one or more of the vanes of the plurality of fluid drivers are connected to the flared inner surface.

19. The impeller assembly of claim 15, wherein the impeller body is integral with the shroud.

20. The impeller assembly of claim 15, wherein the plurality of fluid drivers are connected to one another.

* * * * *